(12) United States Patent
Yan

(10) Patent No.: US 9,883,261 B2
(45) Date of Patent: Jan. 30, 2018

(54) DATA SWITCHING SYSTEM, METHOD FOR SENDING DATA TRAFFIC, AND SWITCHING APPARATUS

(71) Applicant: HUAWEI TECHNOLOGIES CO.,LTD., Shenzhen, Guangdong (CN)

(72) Inventor: Qinghua Yan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 37 days.

(21) Appl. No.: 15/151,509

(22) Filed: May 11, 2016

(65) Prior Publication Data
US 2016/0337726 A1    Nov. 17, 2016

(30) Foreign Application Priority Data

May 15, 2015    (CN) .......................... 2015 1 0249358

(51) Int. Cl.
| | |
|---|---|
| H04J 14/00 | (2006.01) |
| H04Q 11/00 | (2006.01) |
| H04L 12/933 | (2013.01) |
| H04B 10/27 | (2013.01) |
| H04B 10/50 | (2013.01) |
| H04B 10/60 | (2013.01) |

(52) U.S. Cl.
CPC ......... *H04Q 11/0003* (2013.01); *H04B 10/27* (2013.01); *H04B 10/50* (2013.01); *H04B 10/60* (2013.01); *H04L 49/15* (2013.01)

(58) Field of Classification Search
CPC .... H04Q 11/0003; H04B 10/60; H04B 10/27; H04B 10/50; H04L 49/15
USPC ............................................................ 398/45
See application file for complete search history.

(56) References Cited

U.S. PATENT DOCUMENTS

| | | | |
|---|---|---|---|
| 6,606,326 B1 | 8/2003 | Herring | |
| 7,466,703 B1 | 12/2008 | Arunachalam et al. | |
| 2002/0191250 A1* | 12/2002 | Graves | H04Q 11/0066 398/82 |
| 2003/0072052 A1* | 4/2003 | Graves | H04J 14/0208 398/79 |
| 2006/0165111 A1 | 7/2006 | Varma | |

(Continued)

FOREIGN PATENT DOCUMENTS

| | | |
|---|---|---|
| JP | 2015023566 A | 2/2015 |
| WO | 2011083846 A1 | 7/2011 |
| WO | 2014076572 A2 | 5/2014 |

*Primary Examiner* — Juan A Torres
(74) *Attorney, Agent, or Firm* — Huawei Technologies Co., Ltd.

(57) ABSTRACT

The present invention provides a data switching system, including K subsystems, where a first subsystem in the K subsystems includes M switching apparatuses, a first switching apparatus in the M switching apparatuses includes X network side ports, and the X network side ports include M−1 intra-group ports and K−1 inter-group ports, where the M−1 intra-group ports are respectively connected to M−1 switching apparatuses in the first subsystem except the first switching apparatus; and the K−1 inter-group ports are respectively connected to direct switching apparatuses, of the first switching apparatus, in K−1 subsystems in the K subsystems except the first subsystem. Such a structure improves a capacity of a switching system in a case in which no core switching apparatus is required.

19 Claims, 17 Drawing Sheets

(56) References Cited

U.S. PATENT DOCUMENTS

2010/0150147 A1 6/2010 Khanduri
2011/0286326 A1 11/2011 Awano
2014/0169788 A1 6/2014 Hussain et al.

* cited by examiner

DATA SWITCHING SYSTEM, METHOD FOR SENDING DATA TRAFFIC, AND SWITCHING APPARATUS

CROSS-REFERENCE TO RELATED APPLICATION

This application claims priority to Chinese Patent Application No. 201510249358.2, filed on May 15, 2015, which is hereby incorporated by reference in its entirety.

TECHNICAL FIELD

The present invention relates to network communications technologies, and in particular, to a data switching system having a switching apparatus, a method for sending data traffic in the data switching system, and a switching apparatus.

BACKGROUND

A network data traffic model in the cloud computing era changes greatly, where 16% of data traffic is in operator networks, 14% of the data traffic is in enterprise networks, and the other 70% of the data traffic all flows into data switching systems. Data traffic and bandwidth in a data switching system grow exponentially, which has already gone far beyond people's imagination about a conventional network. Large bandwidth and a strong expansion capability already become the first demand of a customer of the data switching system. A bottleneck in constructing the data switching system is increasingly obvious.

FIG. 1 is a schematic diagram of a network structure of an existing large-scale data switching system. In the data switching system, switching apparatuses at an access layer, an aggregation layer, and a core layer are required in implementing intercommunication between all servers, and network scale expansion is limited by a capacity of a core switching apparatus, making it difficult to meet requirements of future service development.

Therefore, it is necessary to provide a new and expansible data switching system, which is not limited by a capacity of a core switching apparatus, to improve a capacity of a switching system.

SUMMARY

Embodiments of the present invention provide a data switching system, a method for sending data traffic in the data switching system, and a switching apparatus. An objective of the present invention is to improve a capacity of a data switching system.

A first aspect of the present invention provides a data switching system, including K subsystems, where a first subsystem in the K subsystems includes M switching apparatuses, a first switching apparatus in the M switching apparatuses includes X network side ports, and the X network side ports include M−1 intra-group ports and K−1 inter-group ports, where the M−1 intra-group ports are respectively connected to M−1 switching apparatuses in the first subsystem except the first switching apparatus; and the K−1 inter-group ports are respectively connected to direct switching apparatuses, of the first switching apparatus, in K−1 subsystems in the K subsystems except the first subsystem.

A second aspect of the present invention provides a switching apparatus, where the switching apparatus is any one of M switching apparatuses in a first subsystem in a data switching system, the switching apparatus includes multiple ports, and each port not only can serve as a user side port but also can serve as a network side port; and the switching apparatus further includes:
a receiver, configured to acquire data traffic through a user side port;
a processor, configured to query a multipath forwarding table according to a destination address of the data traffic to obtain a multipath forwarding entry including the destination address, where the multipath forwarding entry includes a correspondence between the destination address and multiple network side ports; and
a transmitter, configured to send the data traffic according to the multiple network side ports in a load balancing manner, so that all portions of data traffic in the data traffic reach, via different paths, a destination switching apparatus that is located in the same data switching system as the switching apparatus.

A third aspect of the present invention provides another switching apparatus, including multiple ports, where each port not only can serve as a user side port but also can serve as a network side port; and
the switching apparatus further includes:
a receiver, configured to receive data traffic sent by another switching apparatus, where the another switching apparatus is any switching apparatus in a data switching system except the switching apparatus;
a processor, configured to determine whether a forwarding flag is encapsulated for the data traffic, where the forwarding flag is used for instructing the switching apparatus to query a shortest-path forwarding table to acquire a shortest-path forwarding entry of the data traffic, where the shortest-path forwarding entry includes a correspondence between a destination address of the data traffic and one network side port; and when the forwarding flag is encapsulated for the data traffic, determine whether a destination switching apparatus of the data traffic is the switching apparatus; and
a transmitter, configured to forward the data traffic according to a result determined by the processing component.

A fourth aspect of the present invention provides a method for sending data traffic, applied to a data switching system, including:
acquiring, by a source switching apparatus in the data switching system, data traffic through a user side port, where the source switching apparatus is any one of M switching apparatuses in a first subsystem in the data switching system;
querying, by the source switching apparatus, a multipath forwarding table according to a destination address of the data traffic to obtain a multipath forwarding entry including the destination address, where the multipath forwarding entry includes a correspondence between the destination address and multiple network side ports; and
sending, by the source switching apparatus, the data traffic according to the multiple network side ports in a load balancing manner, so that all portions of data traffic in the data traffic reach a destination switching apparatus in the data switching system via different paths.

A fifth aspect of the present invention provides another method for sending data traffic, applied to a data switching system, including:
receiving, by a switching apparatus, data traffic sent by another switching apparatus, where the another switching apparatus is any switching apparatus in the data switching system except the switching apparatus;

determining, by the switching apparatus, whether a forwarding flag is encapsulated for the data traffic, where the forwarding flag is used for instructing the switching apparatus to query a shortest-path forwarding table to acquire a shortest-path forwarding entry of the data traffic, where the shortest-path forwarding entry includes a correspondence between a destination address of the data traffic and one network side port; and when the forwarding flag is encapsulated for the data traffic, determining, by the switching apparatus, whether a destination switching apparatus of the data traffic is the switching apparatus, and forwarding the data traffic according to a determining result.

Based on the fifth aspect, in a first implementation manner of the fifth aspect, when the destination switching apparatus of the data traffic is not the switching apparatus, the forwarding the data traffic according to a determining result includes: forwarding the data traffic according to the shortest-path forwarding entry, so that the data traffic reaches the destination switching apparatus; or when the destination switching apparatus of the data traffic is the switching apparatus, the forwarding the data traffic according to a determining result includes: deleting the forwarding flag from the data traffic, and sending the data traffic from which the forwarding flag has been deleted to a device outside the data switching system according to the shortest-path forwarding entry, in the shortest-path forwarding table, including the destination address of the data traffic.

In the present invention, network side ports of a switching apparatus are divided into intra-group ports and inter-group ports, M switching apparatuses form a subsystem by using intra-group ports, and then multiple subsystems are interconnected by using inter-group ports to form a data switching system. In the present invention, a full mesh of all switching apparatuses can be implemented with only one type of switching apparatus, which resolves a problem that a scale of a conventional data switching system is limited by switching performance of a core layer switching apparatus, thereby improving a capacity of a data switching system.

BRIEF DESCRIPTION OF DRAWINGS

To describe the technical solutions in the embodiments of the present invention or in the prior art more clearly, the following briefly introduces the accompanying drawings required for describing the embodiments or the prior art.

DESCRIPTION OF EMBODIMENTS

The technical solutions according to embodiments of the present invention are described in the following with reference to the accompanying drawings.

Overview of Data Switching System

Figure 1:
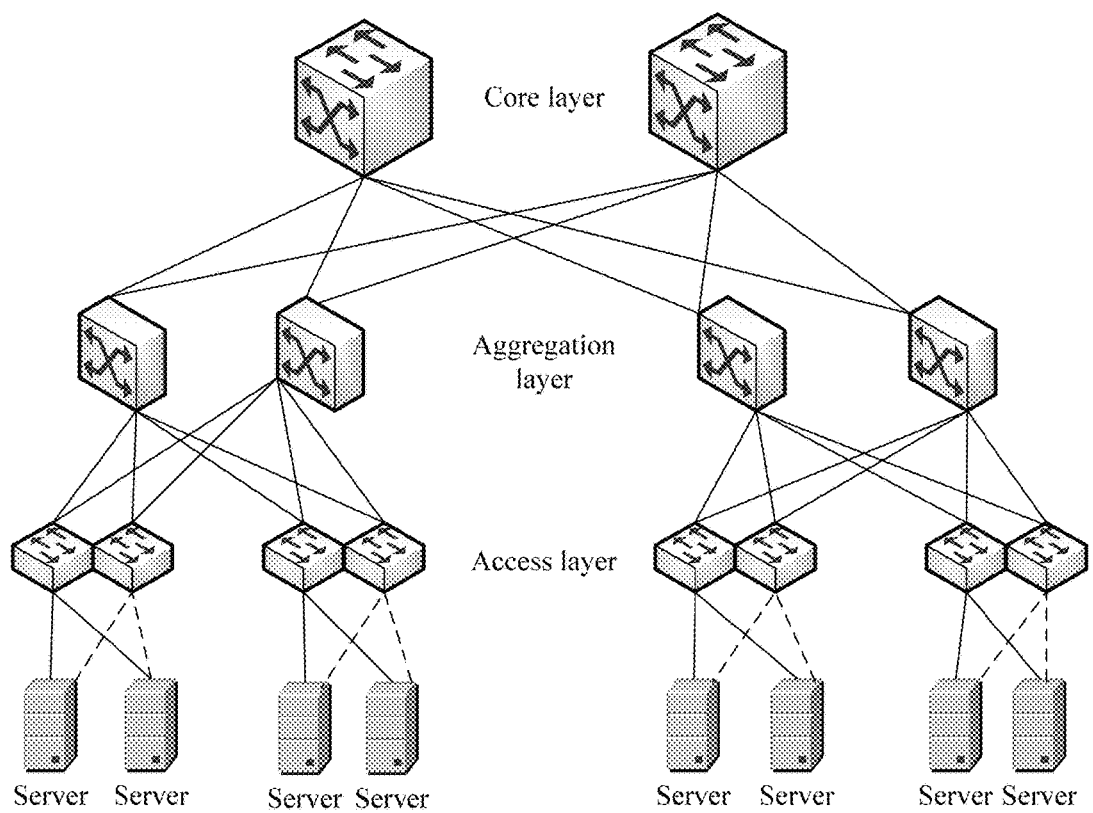
FIG. 1 is a schematic structural diagram of a data switching system in the prior art.
Figure 2:
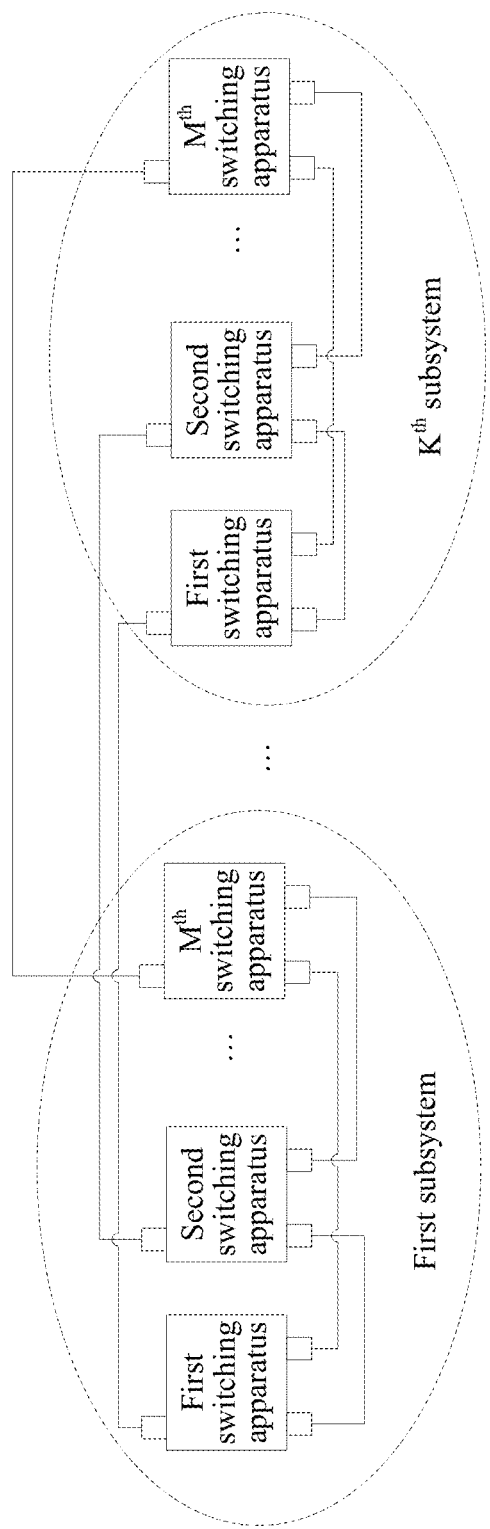
FIG. 2 is a schematic structural diagram of a data switching system according to an embodiment of the present invention.

FIG. 2 is a schematic structural diagram of a data switching system according to an embodiment of the present invention. The data switching system includes K subsystems, a first subsystem in the K subsystems includes M switching apparatuses, a first switching apparatus in the M switching apparatuses includes multiple network side ports, and the multiple ports may be divided into user side ports and network side ports. Generally, a port connected to a server, a client, or a user terminal is a user side port, and a port connected to another switching apparatus is a network side port. The first switching apparatus is interconnected to other switching apparatuses by using multiple network side ports. The multiple network side ports, which are denoted as X network side ports below (three are shown in the figure, and are represented by small blocks), include M−1 intra-group ports and K−1 inter-group ports; the M−1 intra-group ports are respectively connected to M−1 switching apparatuses in the first subsystem except the first switching apparatus; and the K−1 inter-group ports are respectively connected to direct switching apparatuses, of the first switching apparatus, in K−1 subsystems in the K subsystems except the first subsystem. The first subsystem is any one of the K subsystems, and the first switching apparatus is any one of the M switching apparatuses.

An intra-group port is a port used by a switching apparatus to connect to another switching apparatus that is located in a same subsystem as the switching apparatus (a port located at the bottom part in the figure), and an inter-group port is a port used by the switching apparatus to connect to a direct switching apparatus that is located in a subsystem different from the subsystem of the switching apparatus (a port located at the upper part in the figure). Any network side port can be used as an intra-group port or an inter-group port, and therefore, which ports are intra-group ports and which ports are inter-group ports can be known only after network connection. The direct switching apparatus refers to a switching apparatus that communicates with the switching apparatus without passing another switching apparatus. Switching apparatuses in a same subsystem are direct switching apparatuses of each other.

In this embodiment of the present invention, network side ports of a switching apparatus are divided into intra-group ports and inter-group ports, the intra-group ports are configured to connect switching apparatuses in a same subsystem, and the inter-group ports are configured to connect switching apparatuses in different subsystems, so that a data switching system including K*M switching apparatuses can be constructed. The present invention is different from a conventional data switching system in which a network is divided into an access layer, an aggregation layer, and a core layer, and each layer is provided with switching apparatuses of a different type. Therefore, in the data switching system in the present invention, a full mesh of all switching apparatuses can be implemented with only one type of switching apparatus, which resolves a problem that a scale of the conventional data switching system is limited by switching performance of a core layer switching apparatus.

In the data switching system shown in FIG. 2, each pair of switching apparatuses that need to be connected are directly connected using a fiber. When a network scale is relatively large, tens of thousands of pairs of fibers are required, which not only brings severe challenges to physical space of an equipment room, but also causes great difficulties to operations and maintenance such as fault elimination. Moreover, because switching apparatuses in the data switching system have a large quantity of network side ports, a quantity of required optical modules is increased accordingly. The optical modules are connected by using multimode multi-core fibers, and customization costs and connector costs of the multi-core fibers are extremely high. Cabling costs even reach three to four times costs of the optical modules. The present invention further provides a data switching system, to reduce a quantity of fibers of the data switching system, simplify maintenance operations on the data switching system, and reduce costs for constructing the data switching system.

Figure 3:
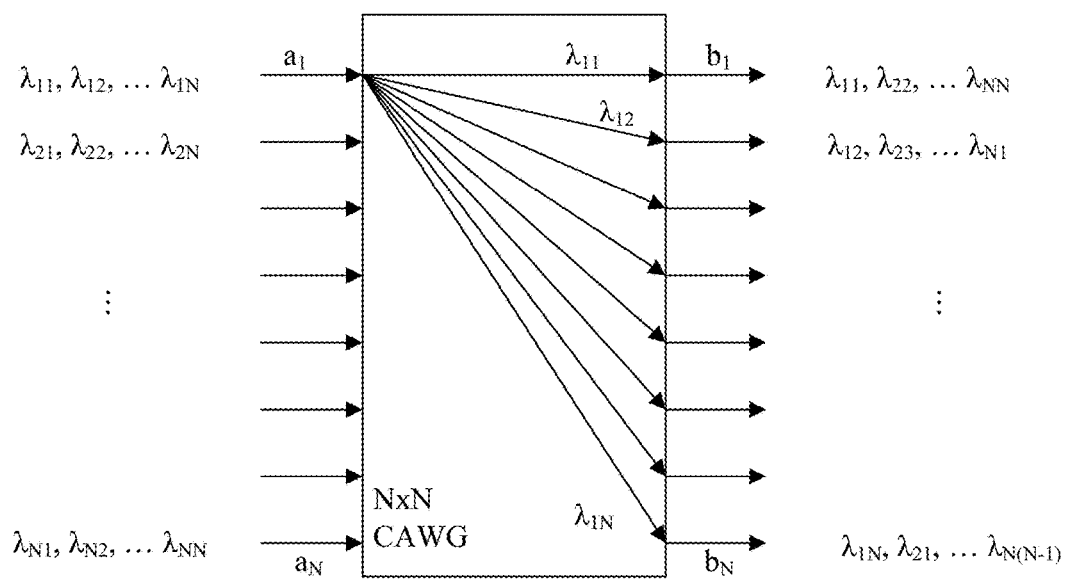
FIG. 3 is a schematic diagram of a working principle of a cyclic arrayed waveguide grating.

FIG. 3 is a schematic diagram of a working principle of a cyclic arrayed waveguide grating (CAWG). The CAWG is also referred to as a cyclic interleaver, and is a wavelength-based N*N cyclic multiplexer/demultiplexer. The CAWG can send, from different incoming ports to different outgoing ports, signals with different wavelengths in a cyclic manner. As shown in FIG. 3, the CAWG has N input fibers and N output fibers, and each input fiber can transmit N wavelengths at most. Therefore, in the case of full load, N*N wavelengths can be input on an input side, and after internal switching, the CAWG respectively allocates N wavelengths of each input fiber to the N different output fibers. Each wavelength may be represented by $\lambda_{ij}$, where $\lambda$ represents a wavelength, i represents an input port group, j represents a sequence number of the wavelength in the input port group, i and j are both positive integers less than or equal to N, and N is a maximum quantity of wavelengths that can be supported by each port of the CAWG. For example, in FIG. 3, N wavelengths that are input on an input port $a_1$ are $\lambda_{11}$, $\lambda_{12}$, ..., and $\lambda_{1N}$, and on an output side, the N wavelengths are respectively allocated to output fibers $b_1$ to $b_N$. Therefore, the CAWG can implement non-blocking switching of the N*N wavelengths.

Figure 4:
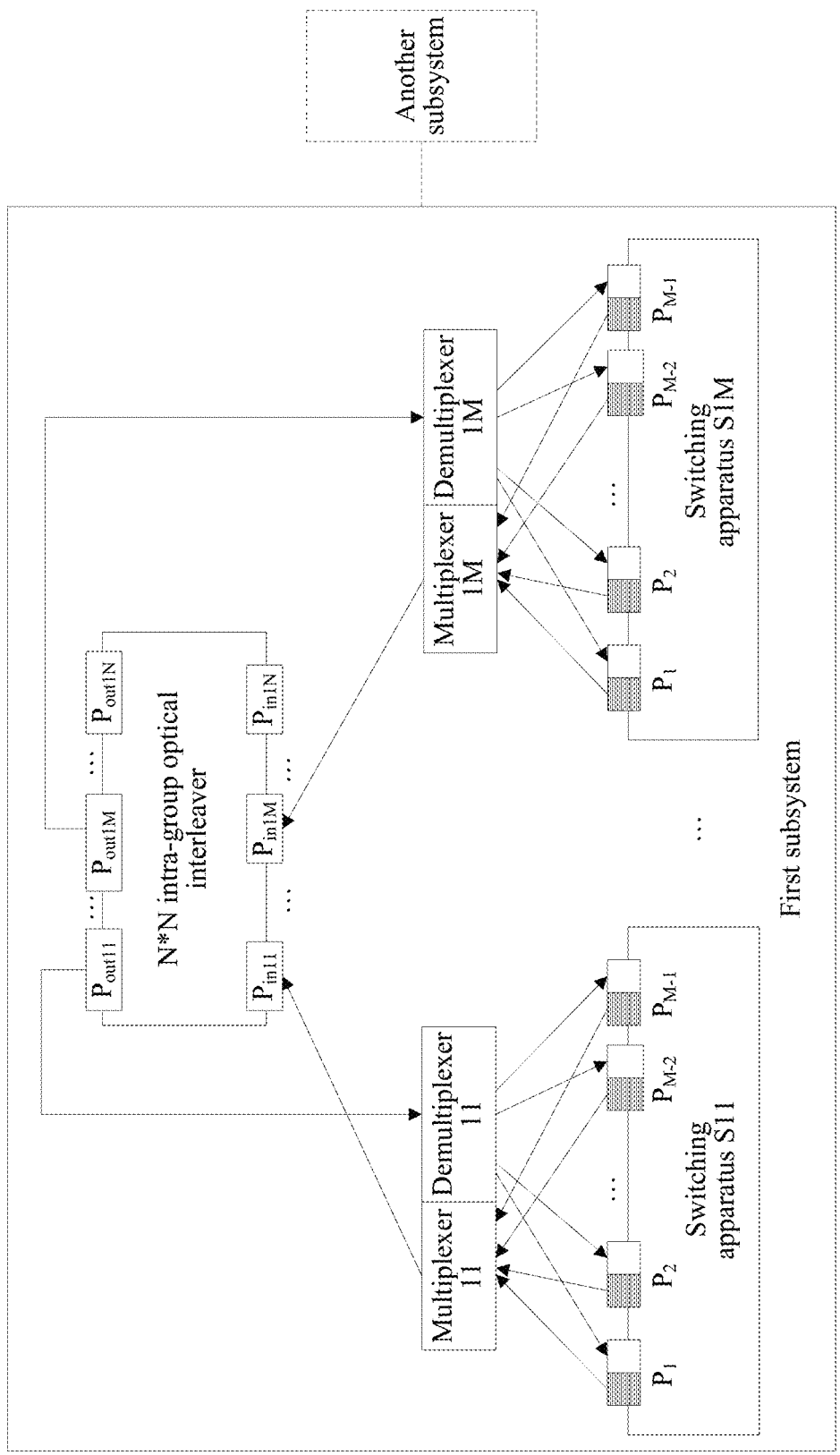
FIG. 4 is a schematic diagram of internal connections of a subsystem in the data switching system when an optical interleaver is used.

It should be noted that, during implementation of the present invention, the CAWG may also be replaced with another device or optical element that can implement the foregoing function. Therefore, in the present invention, a device or an optical element that can implement the foregoing CAWG feature is collectively referred to as an optical interleaver. In this embodiment of the present invention, the foregoing feature of an optical interleaver is used to improve the data switching system shown in FIG. 2. FIG. 4 is a schematic diagram of internal connections of a subsystem in the data switching system when the data switching system is constructed by using the optical interleaver according to this embodiment of the present invention. The subsystem (which may be the first subsystem shown in FIG. 2) further includes an N*N intra-group ("intra-group" is defined below) optical interleaver, which is referred to as an intra-group optical interleaver 1, and the M switching apparatuses in the first subsystem are denoted as S11 and S12 (not shown in the figure) to S1M. N*N refers to a specification of the optical interleaver, that is, quantities of input ports and output ports included in the optical interleaver are both N. Any switching apparatus in the M switching apparatuses, for example, the switching apparatus S11 or S1M, may be the first switching apparatus. Each network side port in the X network side ports includes a transmit optical interface and a receive optical interface. The transmit optical interface is represented by a small block filled with vertical lines, and the receive optical interface is represented by a small blank block. In a implementation manner, quantities of network side ports of all the switching apparatuses are the same. Alternatively, in another implementation manner, quantities of network side ports of different switching apparatuses may be different.

That the M−1 intra-group ports are respectively connected to M−1 switching apparatuses in the first subsystem except the first switching apparatus includes: all transmit optical interfaces of the M−1 intra-group ports are connected to an input port of the N*N intra-group optical interleaver, and all receive optical interfaces of the M−1 intra-group ports are connected to an output port of the N*N intra-group optical interleaver, so as to connect to the M−1 switching apparatuses in the first subsystem except the first switching apparatus by using the N*N intra-group optical interleaver. For example, all of M−1 transmit optical interfaces of the switching apparatus S11 are connected to an input port $P_{in11}$ of the N*N intra-group optical interleaver, and all of M−1 receive optical interfaces of the switching apparatus S11 are connected to an output port $P_{out11}$ of the N*N intra-group optical interleaver.

It should be noted that, in this embodiment of the present invention, all ports of the switching apparatuses are the same, that is, each port can be used as a user side port or a network side port. Therefore, in this embodiment of the present invention, user side ports and network side ports of the switching apparatuses are not strictly distinguished, and which ports are user side ports and which ports are network side ports can be distinguished only after a switching apparatus is connected to a network. Moreover, ports of a switching apparatus may be divided in any manner. For example, a switching apparatus has 48 ports in total, the 48 ports may be divided into 32 user side ports and 16 network side ports as required, or may be divided into 24 user side ports and 24 network side ports.

In this embodiment of the present invention, a system including some switching apparatuses is referred to as a subsystem, and all switching apparatuses form the data switching system. An optical interleaver connecting switching apparatuses in a subsystem is referred to as an intra-group optical interleaver, and an optical interleaver connecting different subsystems is referred to as an inter-group optical interleaver.

Figure 5:
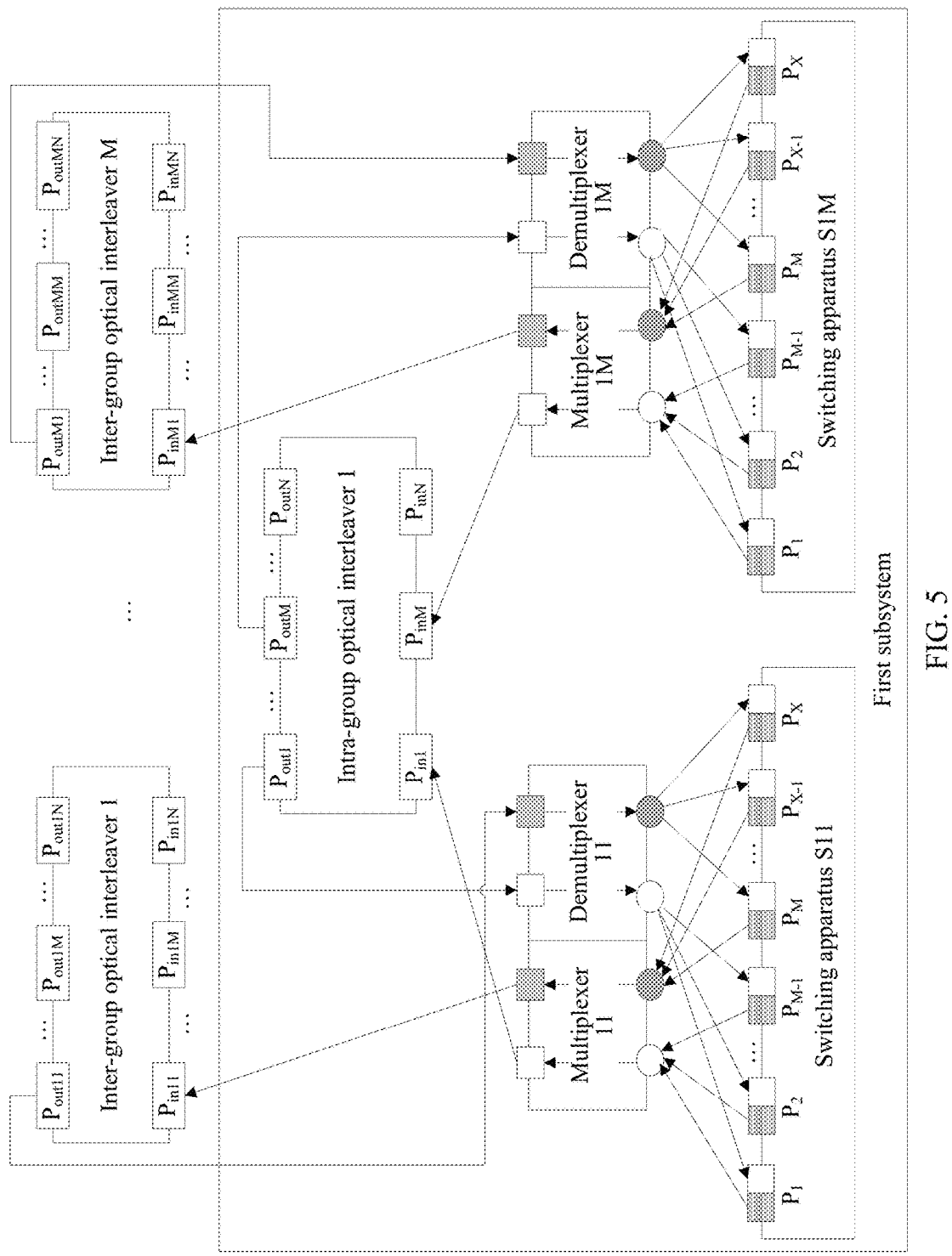
FIG. 5 is a schematic diagram of connection relationships of a first switching apparatus when the data switching system includes multiple N*N inter-group optical interleavers.

In another embodiment of the present invention, to further reduce the quantity of fibers, the data switching system further includes multiple N*N inter-group optical interleavers. FIG. 5 is a schematic diagram of connection relationships of the first switching apparatus when the data switching system includes multiple N*N inter-group optical interleavers. In this case, the M−1 intra-group ports of the first switching apparatus (assumed to be S11) are connected to the intra-group optical interleaver 1 in a manner shown in FIG. 4, all transmit optical interfaces of K−1 inter-group ports (that is, ports $P_M$ to $P_X$) of the first switching apparatus are connected to an input port $P_{in11}$ of a first N*N inter-group optical interleaver (an inter-group optical interleaver 1), and all receive optical interfaces of the K−1 inter-group ports are connected to an output port $P_{out11}$ of the first N*N inter-group optical interleaver.

Because the data switching system have a relatively large quantity of switching apparatuses, for ease of management, switching apparatuses in each subsystem need to be numbered, and the multiple N*N inter-group optical interleavers also need to be numbered, where a sequence number of the first switching apparatus in the first subsystem is the same as a sequence number of the first N*N inter-group optical interleaver in the multiple N*N inter-group optical interleavers, that is, the first N*N inter-group optical interleaver is an inter-group optical interleaver corresponding to the first switching apparatus. One switching apparatus is connected to only one inter-group optical interleaver, and one inter-group optical interleaver can be connected to N switching apparatuses at most. Specifically, in FIG. 5, the switching apparatus S11 is connected to the inter-group optical interleaver 1, and the switching apparatus S1M is connected to an inter-group optical interleaver M.

In the foregoing embodiments of the present invention, the first switching apparatus is an apparatus including a proper circuit element and/or optical element, and includes a switching unit and an interface unit. The switching unit may be a unit has a switching function, such as a switch, a switch board, an interface board, or a line card. The switching unit may be an optical interface switching unit, or may be an electric interface switching unit. When the switching unit is an optical interface switching unit, the interface unit includes X optical modules, the X network side ports are ports of the X optical modules, and in this case, that each network side port includes a transmit optical interface and a receive optical interface refers that a port of each optical module includes a transmit optical interface and a receive optical interface.

When the switching unit is an electric interface switching unit, the interface unit is an electrical/optical conversion unit, the X network side ports are ports of the electrical/optical conversion unit, and in this case, that each network side port includes a transmit optical interface and a receive optical interface refers that each port of the electrical/optical conversion unit includes a transmit optical interface and a receive optical interface.

In FIG. 4 and FIG. 5, to implement that "all transmit optical interfaces of the M−1 intra-group ports are connected to an input port of the N*N intra-group optical interleaver, and all receive optical interfaces of the M−1 intra-group ports are connected to an output port of the N*N intra-group optical interleaver", all transmit optical interfaces of network side ports $P_1$ to $P_{M-1}$ of S11 are connected to M−1 receive ports (represented by a blank circle) of an optical multiplexer 11. In this way, signals sent by all the transmit optical interfaces of the intra-group ports $P_1$ to $P_{M-1}$ are sent to the intra-group optical interleaver 1 through a transmit port (represented by a small blank block) of the optical multiplexer 11 after being multiplexed by the optical multiplexer 11, that is, with only one fiber, a signal sent by each transmit optical interface in the M−1 intra-group ports of S11 can reach the N*N intra-group optical interleaver; similarly, with only one fiber, each receive optical interface in the K−1 inter-group ports can receive a signal from the N*N intra-group optical interleaver.

In FIG. 5, to implement that "all transmit optical interfaces of the K−1 inter-group ports are connected to an input port of a first N*N inter-group optical interleaver, and all receive optical interfaces of the K−1 inter-group ports are connected to an output port of the first N*N inter-group optical interleaver", all transmit optical interfaces in the inter-group ports $P_M$ to $P_X$ of S11 are connected to another K−1 receive ports (represented by a grey circle) of the optical multiplexer 11, and signals sent by the transmit optical interfaces of the inter-group ports $P_M$ to $P_X$ are sent to the inter-group optical interleaver 1 through another transmit port (represented by a small grey block) of the optical multiplexer 11 after multiplexed by the optical multiplexer 11. An optical demultiplexer 11 receives, through a receive port (represented by a small blank block), a signal sent by the intra-group optical interleaver 1, and after demultiplexing the signal, respectively sends signals through K−1 transmit ports (represented by a small blank circle) to receive optical interfaces in the intra-group ports $P_1$ to $P_{M-1}$ of S11. The optical demultiplexer 11 receives, through another receive port (represented by a small grey block), a signal sent by the inter-group optical interleaver 1, and after demultiplexing the signal, respectively sends signals, obtained through demultiplexing, through another K−1 ports (represented by a small grey circle) to receive optical interfaces in the inter-group ports $P_M$ to $P_X$ of S11. In this way, with only two fibers, S11 can communicate with all other switching apparatuses in the data switching system except those in the first subsystem.

Although the optical multiplexer and the optical demultiplexer are used in the foregoing embodiment of the present invention, a person skilled in the art should be aware that, any device that can implement multiplexing and demultiplexing of optical signals can be used to implement the present invention; therefore, the foregoing optical multiplexer and optical demultiplexer constitute no limitation to the present invention.

In an embodiment, when the multiple subsystems have a same scale, for each subsystem, M=N=K, that is, a half of network side ports of each switching apparatus are connected to an intra-group optical interleaver, the other half of network side ports are connected to an inter-group optical interleaver, and a specification N of each intra-group optical interleaver is the same as the quantity M of switching apparatuses in each subsystem.

In another embodiment, the multiple subsystems further include a second subsystem besides the first subsystem, and the second subsystem includes an N'*N' intra-group optical interleaver and Z switching apparatuses, where N'<N and Z<M. That is, the second subsystem has a scale different from a scale of the first subsystem, and a quantity of switching apparatuses in the second subsystem is less than the quantity of switching apparatuses in the first subsystem. A scale of a subsystem refers to a quantity of switching apparatuses included in the subsystem and a quantity of network side ports of each switching apparatus.

Example of Data Switching System

A data switching system in an embodiment of the present invention is further described in detail below by using an example.

Figure 6A:
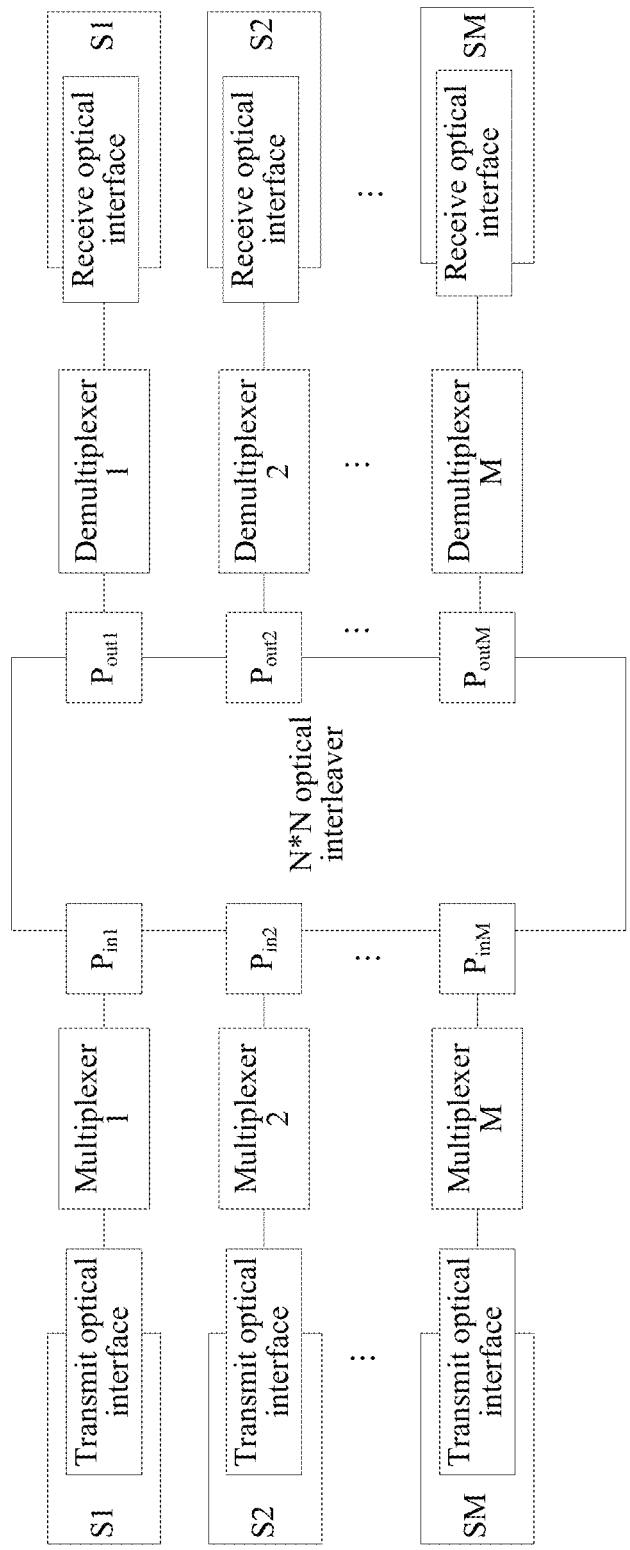
FIG. 6a is a schematic structural diagram of another subsystem according to an embodiment of the present invention.

FIG. 6a is a schematic structural diagram of another subsystem according to an embodiment of the present invention. The subsystem includes an N*N optical interleaver, M switching apparatuses, M optical multiplexers, and M optical demultiplexers. Each switching apparatus corresponds to one optical multiplexer and one optical demultiplexer, the optical multiplexer and the optical demultiplexer may be disposed in a separated or integrated manner, and if the optical multiplexer and the optical demultiplexer are disposed in an integrated manner, each switching apparatus corresponds to one optical multiplexer/demultiplexer. Moreover, as in FIG. 4, each switching apparatus includes X network side ports, and each network side port includes a transmit optical interface and a receive optical interface.

In the data switching system shown in FIG. 6a, M−1 transmit optical interfaces (represented by a block) of a switching apparatus S1 (first switching apparatus) are connected to an input port $P_{in1}$ of the N*N optical interleaver by using an optical multiplexer 1, and M−1 receive optical interfaces are connected to an output port $P_{outs}$ of the N*N optical interleaver by using an optical demultiplexer 1. In an embodiment, M=N.

As can be seen from FIG. 6a, with only one fiber, signals generated by M−1 intra-group ports of the switching apparatus S1 can be sent out after passing through the optical multiplexer 1, and with only one fiber, a signal sent to any port of the switching apparatus S1 can reach the optical demultiplexer 1 corresponding to the switching apparatus S1 and further reach the corresponding port of S1.

Figure 6B:
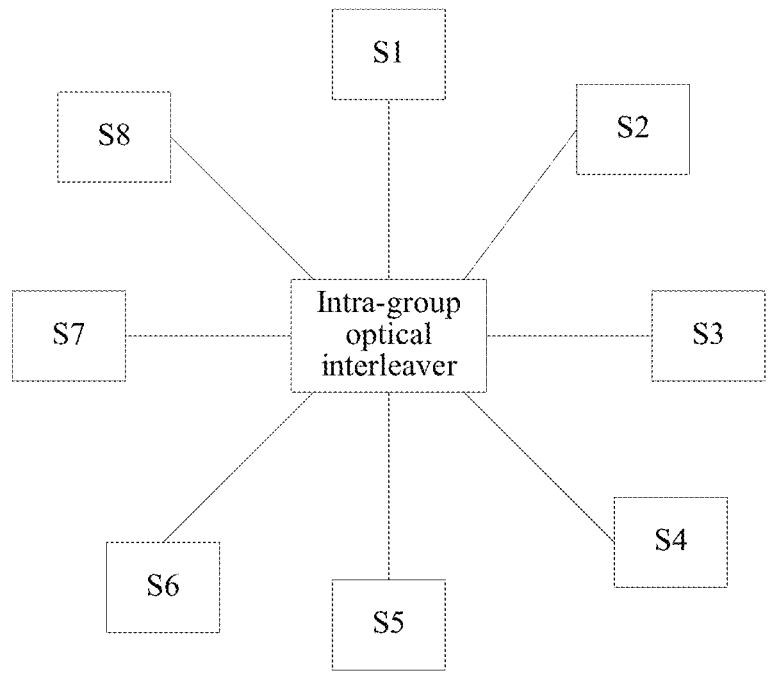
FIG. 6b is a schematic diagram of connection relationships between switching apparatuses in the subsystem shown in FIG. 6a and an intra-group optical interleaver.

When M=8, connection relationships between switching apparatuses in the subsystem shown in FIG. 6a and an intra-group optical interleaver, reference may be made to FIG. 6b. Each solid line represents one pair of fibers, a switching apparatus and an optical multiplexer/demultiplexer corresponding to the switching apparatus are located at one end of the fibers, and the optical interleaver is located at the other end of the fibers. As can be seen from FIG. 6b, all switching apparatuses in the data switching system in the present invention need to be connected to only optical interleavers, which is different from a conventional data switching system in which a network is divided into an access layer, an aggregation layer, and a core layer, and each layer is provided with a switching apparatus of a different type. Therefore, in the data switching system in the present invention, a full mesh of all switching apparatuses can be implemented with only one type of switching apparatus, which resolves a problem that a scale of the conventional data switching system is limited by switching performance of a core layer switching apparatus.

Figure 6C:
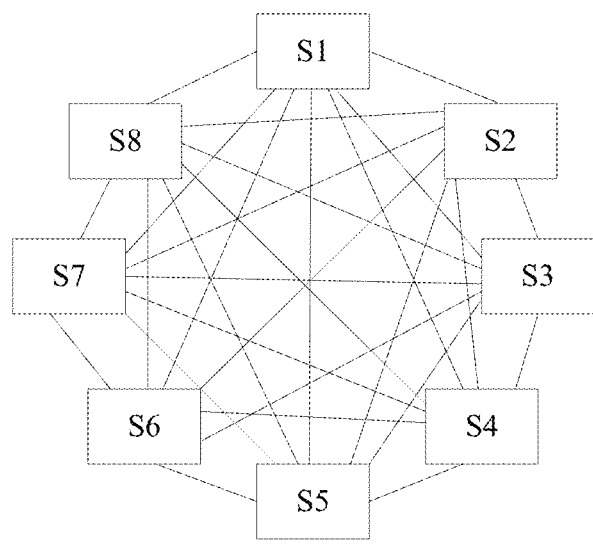
FIG. 6c is a schematic diagram of logical connections between switching apparatuses in the subsystem shown in FIG. 6b.

Eight switching apparatuses shown in FIG. 6b logically form a full-mesh network, which is referred to as a mesh network. As shown in FIG. 6c, FIG. 6c is a schematic diagram of logical connections between the switching apparatuses in the subsystem shown in FIG. 6b. If a network shown in FIG. 6b is constructed by means of only direct connections using fibers, a quantity of required fibers is 28*2(one line represents an input fiber and an output fiber) =56, and if another device exists between switching apparatuses, a quantity of required fibers is increased to 56*2=112. However, if a networking manner shown in FIG. 6a is used, only 8*2=16 fibers are required. That is, if the data switching system in the present invention is used, a quantity of required fibers is only 16÷56=2/7 or 16÷112=1/7 that of the conventional data switching system. Similarly, for a data switching system of another scale, a quantity of fibers required by a data switching system constructed in the networking manner of this patent is only 2/(M−1) or 1/(M−1) that of the conventional data switching system, where M is a quantity of switching apparatuses in each subsystem in the data switching system.

As can be seen, with the data switching system in this embodiment of the present invention, a quantity of fibers required by a data switching system can be greatly reduced, thereby reducing cabling costs. Moreover, because the quantity of required fibers is greatly reduced in this embodiment of the present invention, the difficulty of cabling in an equipment room of the data switching system is lowered, making physical deployment of switching apparatuses simple and easy.

When a data switching system with a relatively large scale needs to be constructed, because a relatively large quantity of switching apparatuses are required, the switching apparatuses may be divided to obtain multiple switching groups, and switching apparatuses in each switching group form a subsystem by using an intra-group optical interleaver; then the multiple switching groups may form multiple subsystems, and the multiple subsystems are connected by using multiple inter-group optical interleavers, thereby forming a data switching system in which all switching apparatuses are logically fully meshed. A specification of the inter-group optical interleaver and a specification of the intra-group optical interleaver may be the same or different, a specification of one intra-group optical interleaver and a specification of another intra-group optical interleaver may be the same or different, and specifications of all the inter-group optical interleavers are the same. Preferably, the specification of the inter-group optical interleaver and the specification of the intra-group optical interleaver are the same. When specifications of multiple intra-group optical interleavers are different, the specification of the inter-group optical interleavers is greater than or equal to a specification of an intra-group optical interleaver having a maximum specification in the multiple intra-group optical interleavers.

According to an embodiment of the present invention, when a data switching system is constructed, a specification of an inter-group optical interleaver may be determined according to a quantity of network side ports of a used switching apparatus, and switching apparatuses are divided according to the specification of the inter-group optical interleaver to obtain multiple switching groups. For example, when the inter-group optical interleaver is an N*N optical interleaver, each switching group includes multiple switching apparatuses having a same specification (that is, quantities of network side ports are the same), where quantities of switching apparatuses included in all the switching groups may be the same or different, and a quantity of switching apparatuses in each switching group is not greater than N. Some network side ports of all switching apparatuses in each switching group are connected by using an intra-group optical interleaver in the switching group to form a subsystem shown in FIG. 6a. All subsystems are connected by using multiple inter-group optical interleavers to form a data switching system. When the subsystems are connected to the inter-group optical interleavers, a sequence number of a switching apparatus in a subsystem in which the switching apparatus is located is the same as a sequence number of an N*N inter-group optical interleaver corresponding to the switching apparatus in the multiple N*N inter-group optical interleavers. For example, a switching apparatus with a sequence number of 1 in each subsystem is connected to an inter-group optical interleaver 1, and a switching apparatus with a sequence number of 2 is connected to an inter-group optical interleaver 2, and so on, until each switching apparatus in each subsystem is connected to a corresponding inter-group optical interleaver. For a specific connection manner for the switching apparatuses, reference may be made to FIG. 5.

Figure 7:
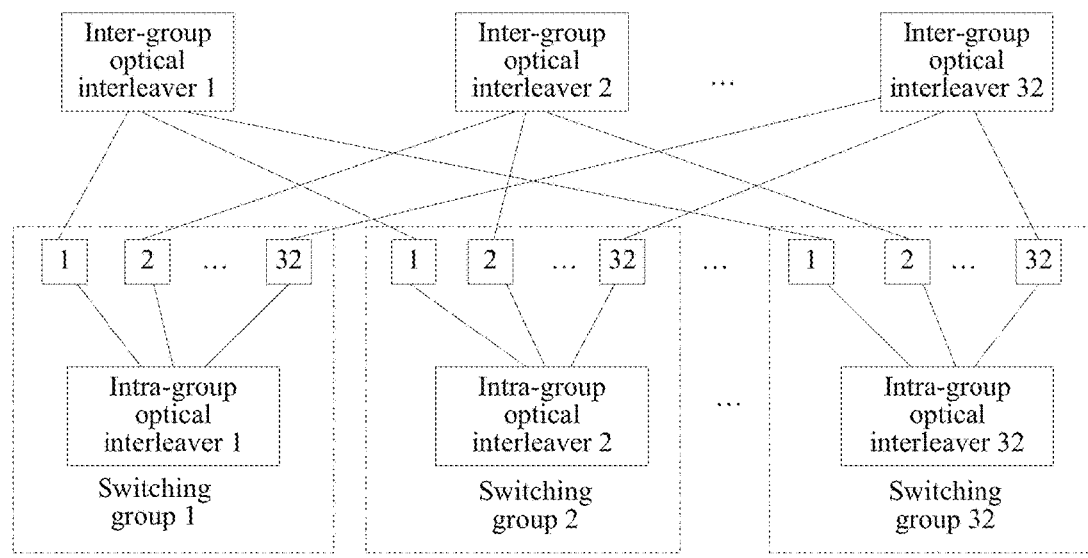
FIG. 7 is a schematic structural diagram of another data switching system according to an embodiment of the present invention.

Based on a connection method shown in FIG. 5, as shown in FIG. 7, FIG. 7 is a schematic structural diagram of another data switching system according to an embodiment of the present invention. The data switching system includes 1024 switching apparatuses, an inter-group optical interleaver used in this embodiment is a 32*32 optical interleaver, and each switching group includes 1024÷32=32 switching apparatuses. To simplify configuration and improve utilization of optical interleavers, in this embodiment, a 32*32 optical interleaver is also selected as an intra-group optical interleaver, which requires each switching apparatus to provide 2*(N−1)=62 network side ports, where 31 network side ports of each switching apparatus in each switching group are connected as intra-group ports to an intra-group optical interleaver to form a subsystem, and the other 31 network side ports are connected as inter-group ports to an inter-group optical interleaver corresponding to the switching apparatus. For example, transmit optical interfaces and receive optical interfaces in 31 intra-group ports of a switching apparatus 1 in a switching group 1 are each connected (represented by a same line in the figure) to an intra-group optical interleaver 1, and 31 inter-group ports are connected to an inter-group optical interleaver 1. To facilitate management, switching apparatuses with a same sequence number in the switching groups are connected to a same inter-group optical interleaver. In a manner shown in FIG. 7, a full mesh of the 1024 switching apparatuses can be implemented by using only 4096 cross-equipment room fibers, which greatly reduces a quantity of fibers required by the data switching system.

Figure 8:
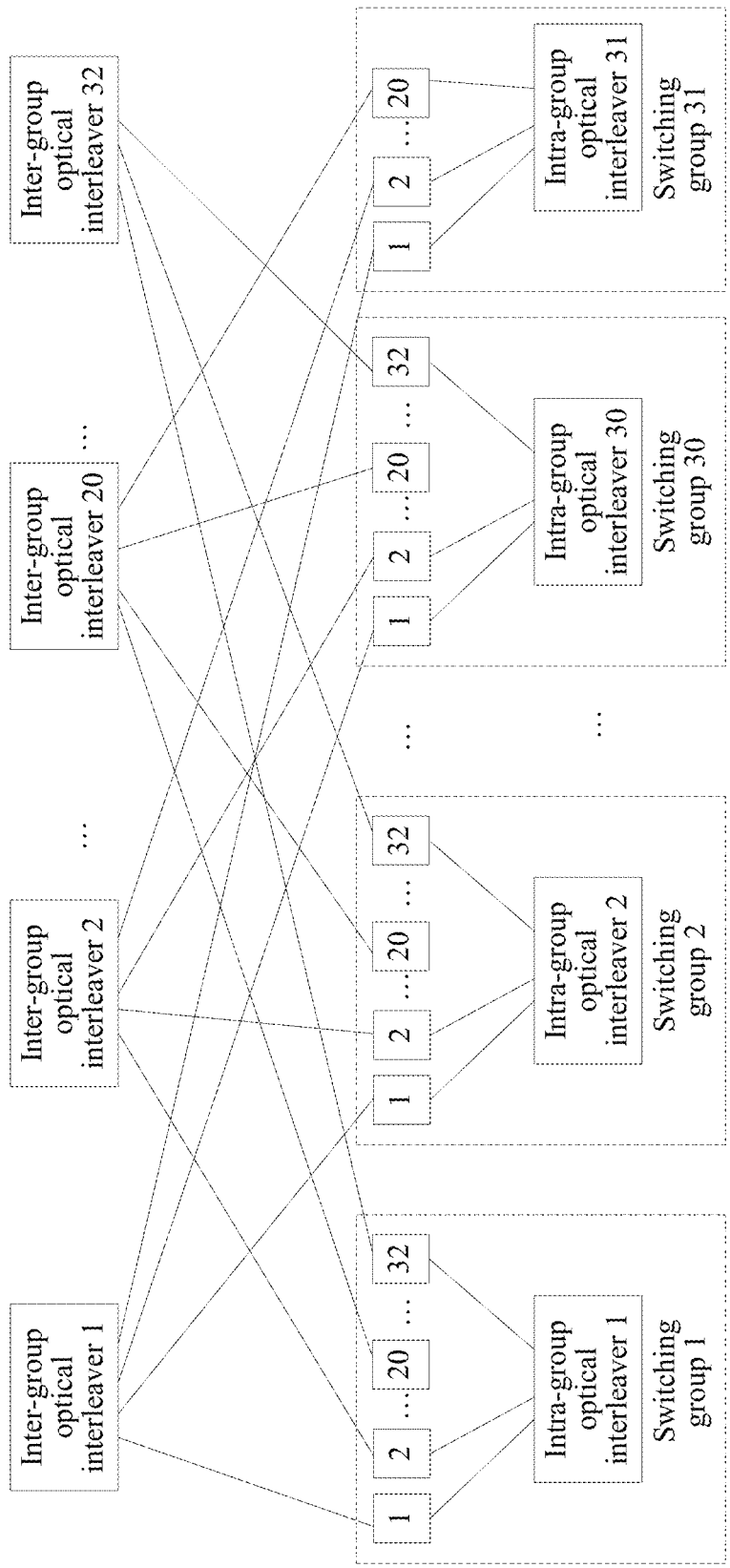
FIG. 8 is a schematic structural diagram of still another data switching system according to an embodiment of the present invention.

When a quantity of switching apparatuses is not a multiple of N, a method provided in this embodiment of the present invention can still be used. As shown in FIG. 8, FIG. 8 is a schematic structural diagram of still another data switching system according to an embodiment of the present invention. The data switching system shown in FIG. 8 includes 980 switching apparatuses in total, and a 32*32 optical interleaver is still used as an inter-group optical interleaver according to the scale of the data switching system. In this way, 32 inter-group optical interleavers are required in this embodiment. As 980÷32=30 . . . 20, the 980 switching apparatuses are divided into 31 switching groups. The first 30 groups each include 32 switching apparatuses, where each switching apparatus provides 62 network side ports, and the last group, that is, the $31^{st}$ group includes 20 switching apparatuses, where each switching apparatus of the $31^{st}$ group needs to provide 31(inter-group ports)+19 (intra-group ports)=50 network side ports, and a subsystem including the 20 switching apparatuses of the $31^{St}$ group may be considered as the second subsystem mentioned above. In this way, intra-group optical interleavers corresponding to the first 30 groups are 32*32 optical interleavers, and an intra-group optical interleaver corresponding to the last group may be any optical interleaver whose specification is greater than or equal to 20*20. In this embodiment, still a half of network side ports of each switching apparatus are connected to a corresponding intra-group optical interleaver, the other half of network side ports are connected to a same inter-group optical interleaver, and all switching apparatuses with a same sequence number in the switching groups are connected to a same inter-group optical interleaver. In this way, because the switching group 31 includes only 20 switching apparatuses, inter-group optical interleavers 21 to 32 are connected to only 30 switching apparatuses, and inter-group optical interleavers 1 to 20 are each connected to 31 switching apparatuses. In the foregoing networking, a full mesh of the 980 switching apparatuses can be implemented by using only 980*4 fibers.

In a conventional access switching apparatus, a user side port and a network side port are distinguished, and a quantity of network side ports are far less than a quantity of user side ports. When a large-scale data switching system needs to be constructed, a full mesh of all access switching apparatuses needs to be implemented in a manner in which access switching apparatuses are aggregated to a core switching apparatus layer by layer. This conventional manner is limited by a port scale of the core switching apparatus, and is unfavorable for network expansion. In this embodiment of the present invention, when a data switching system is constructed, only optical interleavers and ordinary access switching apparatuses need to be used, and no core switching apparatus needs to be used, which eliminates the limitation from the core switching apparatus in the conventional networking manner. In this embodiment of the present invention, a scale of the data switching system is determined by a specification of an optical interleaver. Currently, a largest optical interleaver is an 80*80 optical interleaver, and with optical interleavers of such a specification, a data switching system with a switching capacity that is 50 times greater than an existing data switching system can be constructed. Therefore, according to the solution in this embodiment of the present invention, a quantity of fibers can be reduced, cabling and maintenance costs can be reduced, and a scale of a data switching system can be greatly expanded.

The switching apparatuses in the foregoing implementation manners of the data switching system in the present invention may be independent switches, or may be interface boards that are deployed in a distributed manner, where the interface boards support both a switching function and a control function. When the switching apparatuses are interface boards that are deployed in a distributed manner, the data switching system is actually equivalent to a large-scale switch deployed in a distributed manner, and a subsystem of the data switching system is equivalent to an interface board group. In this way, the switch includes K interface board groups, a first interface board group in the K interface board groups includes M interface boards, a first interface board in the M interface boards includes X network side ports, and the X network side ports include M−1 intra-group ports and K−1 inter-group ports; the M−1 intra-group ports are respectively connected to M−1 interface boards in the first interface board group except the first interface board; and the K−1 inter-group ports are respectively connected to direct interface board of the first interface board in K−1 interface board groups in the K interface board groups except the first interface board group.

Processing of Data Traffic by Source Switching Apparatus

Any switching apparatus in the data switching system provided in the foregoing embodiments of the present invention can support transmission of data traffic in the data switching system. Because there are a large quantity of data streams in the data switching system, during data traffic forwarding, each switching apparatus may be a source switching apparatus, or may be a destination switching apparatus, or may further be an intermediate switching apparatus.

The source switching apparatus acquires data traffic from a user side port, and sends the data traffic to a destination switching apparatus by using the data switching system. An intermediate switching apparatus is a switching apparatus located on a path between the source switching apparatus and the destination switching apparatus; and the destination switching apparatus receives the data traffic from the source switching apparatus or the intermediate switching apparatus, and sends the data traffic through a user side port.

When used as a source switching apparatus, a switching apparatus in this embodiment of the present invention can execute a method for sending data traffic. Particularly, the source switching apparatus includes multiple ports, and each port can be used as a user side port or a network side port. The source switching apparatus may be, but is not limited to, a switching apparatus 1700 shown in FIG. 17.

Figure 9:
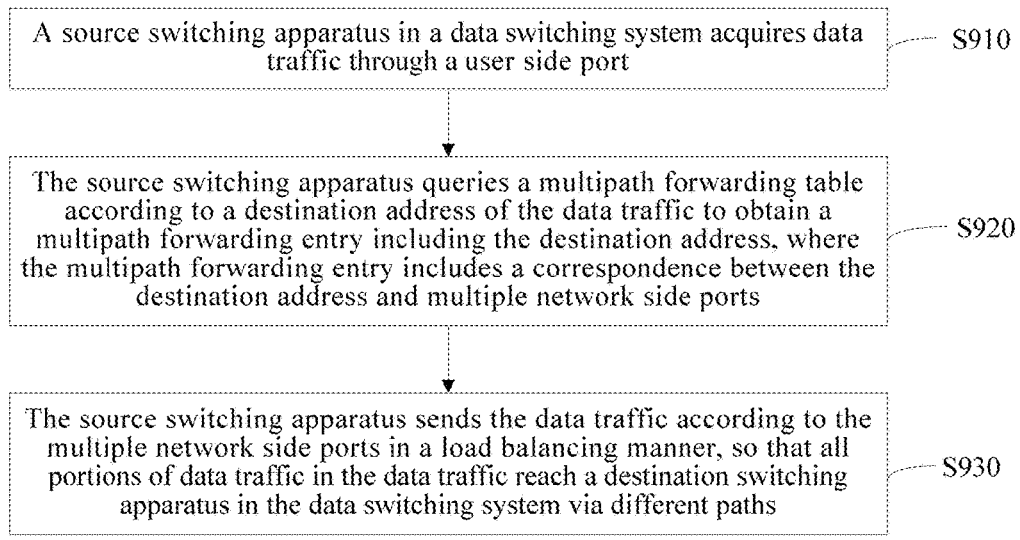
FIG. 9 is a schematic flowchart of a method for sending data traffic according to an embodiment of the present invention.

As shown in FIG. 9, the method includes steps S910, S920, and S930.

S910: A source switching apparatus in a data switching system acquires data traffic through a user side port.

The source switching apparatus may be any switching apparatus in any subsystem in the foregoing embodiments of the data switching system. The acquiring data traffic may be receiving, by the source switching apparatus, the data traffic from a user or a server, or actively requesting, by the source switching apparatus, the data traffic from a user or a server. In a word, the data traffic enters the source switching apparatus from the user side port of the source switching apparatus.

Figure 17:
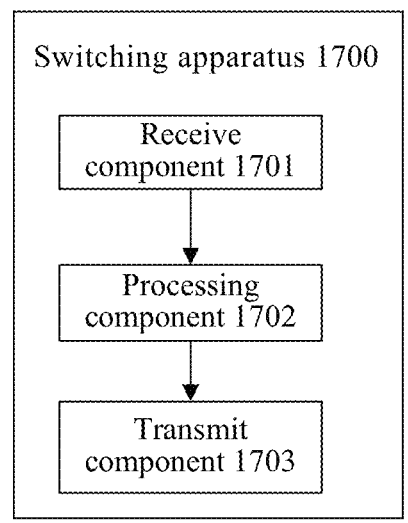
FIG. 17 is a schematic structural diagram of a switching apparatus according to an embodiment of the present invention.

Step S910 may be performed by, for example, a receive component 1701 of the switching apparatus 1700 in FIG. 17, where the receive component 1701 may be any one of a receiver, a receiving unit, and a user side port.

S920: The source switching apparatus queries a multipath forwarding table according to a destination address of the data traffic to obtain a multipath forwarding entry including the destination address, where the multipath forwarding entry includes a correspondence between the destination address and multiple network side ports.

In this embodiment of the present invention, each switching apparatus stores at least two forwarding tables, where one is a shortest-path forwarding table, and one is a multipath forwarding table. Each entry of the multipath forwarding table includes a correspondence between a destination address and multiple network side ports, and each entry of the shortest-path forwarding table includes a correspondence between a destination address and only one network side port.

Specifically, each entry of the multipath forwarding table includes at least a destination address and multiple network side ports corresponding to the destination address. When the destination switching apparatus and the source switching apparatus are located in a same subsystem, a quantity of the multiple network side ports is M−1. When the destination switching apparatus and the source switching apparatus are located in different subsystems, a quantity of the multiple network side ports may be M−1, M, or 2*(M−1), where M is a quantity of switching apparatuses in the subsystem in which the source switching apparatus is located.

In this embodiment of the present invention, the destination address of the data traffic may be a destination Internet Protocol (IP) address or a destination media access control (MAC) address.

The shortest-path forwarding table and the multipath forwarding table may be stored in different storage components or a same storage component of the source switching apparatus, where the storage component may be a volatile memory, such as a random access memory (RAM), or may be a non-volatile memory, such as a read-only memory (ROM), a flash memory, a hard disk drive (HDD), or a solid-state drive (SSD); or the storage component may include a combination of the foregoing types of memories.

Step S920 may be implemented by a processing component 1702 of the switching apparatus 1700 in FIG. 17, where the processing component 1702 may be any one of a processor, a central processing unit (CPU), an application-specific integrated circuit (ASIC), and a data plane, or may be a processor, processing unit, or processing circuit of another type.

S930: The source switching apparatus sends the data traffic according to the multiple network side ports in a load balancing manner, so that all portions of data traffic in the data traffic reach, via different paths, a destination switching apparatus that is located in the same data switching system as the source switching apparatus, where the data switching system includes at least one subsystem.

The sending the data traffic according to the multiple network side ports in a load balancing manner includes: dividing the data traffic into multiple portions, and sending one portion of data traffic to each network side port in the multiple network side ports.

In an embodiment of the present invention, to implement that when another switching apparatus in the data switching system except the source switching apparatus receives one portion of the data traffic, the another switching apparatus does not send the received portion of data traffic in a load balancing manner, according to an implementation manner of the present invention, before the sending the data traffic according to the multiple network side ports in a load balancing manner, the method further includes: encapsulating, by the source switching apparatus, a forwarding flag for the data traffic, where the forwarding flag is used for instructing a switching apparatus receiving the data traffic to query the shortest-path forwarding table to acquire a shortest-path forwarding entry of the data traffic. The shortest-path forwarding entry includes the destination address and one network side port. The encapsulating a forwarding flag may be performed before dividing the data traffic into multiple portions or after dividing the data traffic into multiple portions.

In another implementation manner of the present invention, the source switching apparatus does not need to encapsulate the forwarding flag for the traffic, and a switching apparatus receiving the traffic determines an outgoing port of the traffic according to an attribute (intra-group port or inter-group port) of a port receiving the traffic and whether the destination switching apparatus of the traffic and the switching apparatus are located in a same subsystem.

The source switching apparatus sends one portion of data traffic to each of the multiple network side ports in a polling or hash manner to implement load sharing.

Step S930 may be performed by a transmit component 1703 of the switching apparatus 1700 in FIG. 17, where the transmit component 1703 may be any one of a transmitter, a sending unit, and a network side port.

In the method for sending data traffic in this embodiment of the present invention, data traffic is sent by a source switching apparatus to a destination switching apparatus via multiple non-equivalent paths, which effectively improves utilization of network side ports of switching apparatuses, and avoids congestion of a data switching system.

To further improve the utilization of the network side ports of the switching apparatuses, it is assumed that the source switching apparatus is located in a first subsystem; after the source switching apparatus receives, through a network side port, data traffic sent by another switching apparatus (in this case, the source switching apparatus is an intermediate switching apparatus of the data traffic sent by the another switching apparatus), the source switching apparatus determines an attribute of the network side port, and determines that a destination switching apparatus of the data traffic received through the network side port is located in the first subsystem. In an embodiment, when the network side port is an intra-group port and the destination switching apparatus of the data traffic received through the network side port is not located in the first subsystem, the source switching apparatus divides the data traffic received through the network side port into M portions, sends one portion of data traffic therein through the intra-group port to a direct switching apparatus, of the destination switching apparatus, in the first subsystem, and respectively sends the other M−1 portions of the traffic through M−1 inter-group ports of the switching apparatus to direct switching apparatuses, of the destination switching apparatus, in another M−1 subsystems. In another embodiment, when the network side port is an inter-group port and the destination switching apparatus of the data traffic received through the network side port is not located in the first subsystem, the source switching apparatus divides the data traffic received through the network side port into M portions, sends one portion of data traffic therein through the inter-group port to a direct switching apparatus in a subsystem in which the destination switching apparatus is located, and respectively sends the other M−1 portions of the traffic through M−1 intra-group ports of the switching apparatus to another M−1 switching apparatuses in the first subsystem.

Specific Implementation Manner of Load Balancing in Source Switching Apparatus

In this embodiment of the present invention, network side ports of a switching apparatus are divided into two types, where one type is connected by using an intra-group optical interleaver to a switching apparatus that is located in a same subsystem, and is referred to as an intra-group port, and the other type is connected by using an inter-group optical interleaver to a switching apparatus that is located in a different subsystem, and is referred to as an inter-group port.

In an implementation manner A, the source switching apparatus and the destination switching apparatus are located in a same subsystem, the subsystem includes M switching apparatuses, the multiple network side ports include M−1 intra-group ports, and the sending the data traffic according to the multiple network side ports in a load balancing manner includes: dividing the data traffic into M−1 portions, and respectively sending the M−1 portions of the data traffic through the M−1 intra-group ports to the other M−1 switching apparatuses in the subsystem except the source switching apparatus.

In an implementation manner B, the source switching apparatus and the destination switching apparatus are located in different subsystems, a quantity of the multiple network side ports is M, the M network side ports include one inter-group port and M−1 intra-group ports, and the sending the data traffic according to the multiple network side ports in a load balancing manner includes: dividing the data traffic into M portions, sending one portion of data traffic therein through the inter-group port to a direct switching apparatus, of the source switching apparatus, in a subsystem in which the destination switching apparatus is located, and respectively sending the other M−1 portions of the data traffic through the M−1 intra-group ports to the other M−1 switching apparatuses in the subsystem in which the source switching apparatus is located except the source switching apparatus.

In an implementation manner C, the source switching apparatus and the destination switching apparatus are located in different subsystems in the data switching system and are connected to different inter-group optical interleavers, a quantity of the multiple network side ports is M, the M network side ports include one intra-group port and M−1 inter-group ports, and the sending the data traffic according to the multiple network side ports in a load balancing manner includes: dividing the data traffic into M portions, sending one portion of data traffic therein through the intra-group port to a direct switching apparatus, of the destination switching apparatus, in the subsystem in which the source switching apparatus is located, and respectively sending the other M−1 portions of the data traffic through the M−1 inter-group ports to direct switching apparatuses, of the source switching apparatus, in M−1 subsystems except the subsystem in which the source switching apparatus is located.

In an implementation manner D, the source switching apparatus and the destination switching apparatus are located in different subsystems in the data switching system and are connected to a same inter-group optical interleaver, the multiple network side ports are M−1 inter-group ports, and the sending the data traffic according to the multiple network side ports in a load balancing manner includes: dividing the data traffic into M−1 portions, and respectively sending the M−1 portions of the data traffic through the M−1 inter-group ports to direct switching apparatuses, of the source switching apparatus, in M−1 subsystems except the subsystem in which the source switching apparatus is located.

In an implementation manner E, the source switching apparatus and the destination switching apparatus are located in different subsystems in the data switching system and are connected to different inter-group optical interleavers, the M network side ports include M−1 intra-group ports and M−1 inter-group ports, and the sending the data traffic according to the multiple network side ports in a load balancing manner includes: dividing the data traffic into 2*(M−1) portions, respectively sending M−1 portions of the data traffic through the M−1 intra-group ports to M−1 switching apparatuses in the subsystem in which the source switching apparatus is located except the source switching apparatus, and respectively sending the other M−1 portions of the data traffic through the M−1 inter-group ports to direct switching apparatuses, of the source switching apparatus, in M−1 subsystems except the subsystem in which the source switching apparatus is located.

Process of Generating Multipath Forwarding Table

In an embodiment, the source switching apparatus (which may be any switching apparatus in the data switching system) further needs to acquire the multipath forwarding table. The multipath forwarding table may be generated by a controller or the source switching apparatus. When the multipath forwarding table is generated by the controller, that the source switching apparatus acquires the multipath forwarding table includes: acquiring, by the source switching apparatus, the multipath forwarding table from the controller. The controller and the source switching apparatus use a same algorithm to generate the multipath forwarding table.

Figure 10:
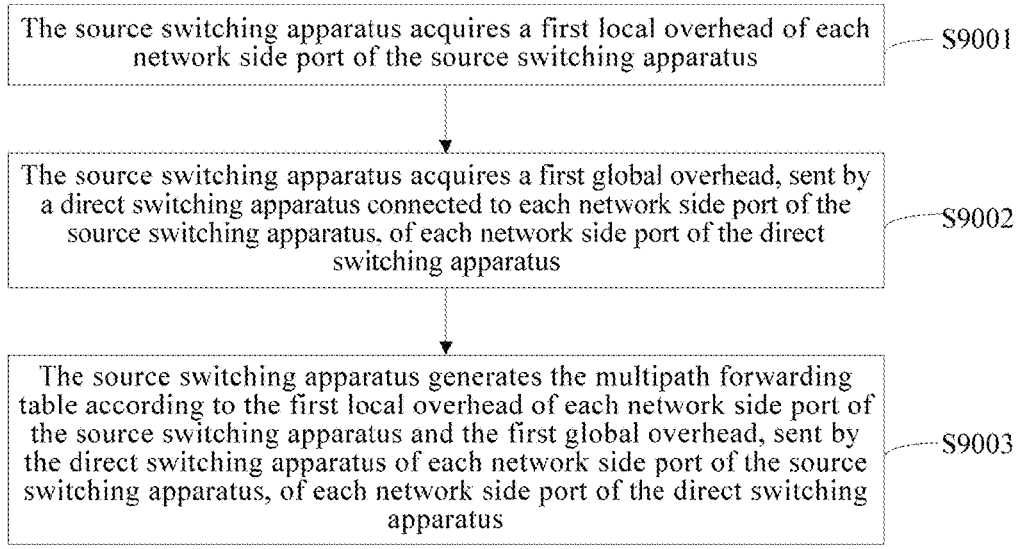
FIG. 10 is a schematic diagram of a process of generating a multipath forwarding table by a source switching apparatus according to an embodiment of the present invention.

The process of generating the multipath forwarding table is described below by using FIG. 10 in which the source switching apparatus generates the multipath forwarding table as an example. Specifically, the multipath forwarding table may be generated by a processing component 1702 of the switching apparatus 1700 in FIG. 17, and the process includes:

S9001: The source switching apparatus acquires a first local overhead of each network side port of the source switching apparatus.

The first local overhead is configured on the source switching apparatus and is used by the source switching apparatus only in calculating the multipath forwarding table.

In an implementation manner, all network side ports of the source switching apparatus have a same first local overhead.

S9002: The source switching apparatus acquires a first global overhead, sent by a direct switching apparatus connected to each network side port of the source switching apparatus, of each network side port of the direct switching apparatus.

The first global overhead is an overhead published by another switching apparatus and used by the source switching apparatus in calculating the multipath forwarding table.

In an implementation manner, first global overheads of all network side ports published by all switching apparatuses are the same.

S9003: The source switching apparatus generates the multipath forwarding table according to the first local overhead of each network side port of the source switching apparatus and the first global overhead, sent by the direct switching apparatus of each network side port of the source switching apparatus, of each network side port of the direct switching apparatus.

Because all the switching apparatuses in the data switching system in this embodiment of the present invention are fully connected, after receiving the first global overhead, sent by the direct switching apparatus of each network side port of the source switching apparatus, of each network side port of the direct switching apparatus, the source switching apparatus can calculate paths in the entire data switching system, to generate the multipath forwarding table.

In this embodiment of the present invention, a local overhead and a global overhead need to be configured for each network side port in advance. The local overhead of the network side port is an overhead used when a switching apparatus to which the network side port belongs calculates a path relevant to the network side port, and includes a first local overhead used for calculating the multipath forwarding table and a second local overhead used for calculating the shortest-path forwarding table. The global overhead of the network side port is an overhead sent by the switching apparatus to which the network side port belongs to another switching apparatus, and used when the another switching apparatus calculates the path relevant to the network side port. Similarly, in this embodiment of the present invention, the global overhead of the network side port includes a first global overhead used for calculating the multipath forwarding table and a second global overhead used for calculating the shortest-path forwarding table.

The network side port may include only an intra-group port, or may include an intra-group port and an inter-group port.

In an implementation manner, the network side ports include only intra-group ports, and the acquiring, by the source switching apparatus, a first local overhead of each network side port of the source switching apparatus includes: acquiring, by the source switching apparatus, a first local overhead of each intra-group port of the source switching apparatus. For example, in FIG. 12 (a detailed description is provided below), a source switching apparatus S1 acquires first local overheads of ports P2 to P8 of S1 that are configured to connect to switching apparatuses S2 to S8.

The acquiring, by the source switching apparatus, a first global overhead, sent by a direct switching apparatus connected to each network side port of the source switching apparatus, of each network side port of the direct switching apparatus includes: acquiring, by the source switching apparatus, a first global overhead of each intra-group port of each switching apparatus that is located in the same subsystem as the source switching apparatus. For example, in FIG. 12, S2 to S8 and S1 are in a same subsystem, S2 to S8 are all direct switching apparatuses of S1, and S1 receives a first global overhead of each intra-group port of each of S2 to S8 sent by each of S2 to S8.

In another implementation manner, the network side ports include intra-group ports and inter-group ports, and the acquiring, by the source switching apparatus, a first local overhead of each network side port of the source switching apparatus includes: separately acquiring, by the source switching apparatus, first local overheads of each intra-group port and each inter-group port of the source switching apparatus. For example, in FIG. 13 (a detailed description is provided below), network side ports of a source switching apparatus S11 not only include intra-group ports connected to an intra-group optical interleaver 1, but also include inter-group ports connected to an inter-group optical interleaver 1, and the source switching apparatus S11 needs to acquire first local overheads of each intra-group port and each inter-group port.

Figure 13:
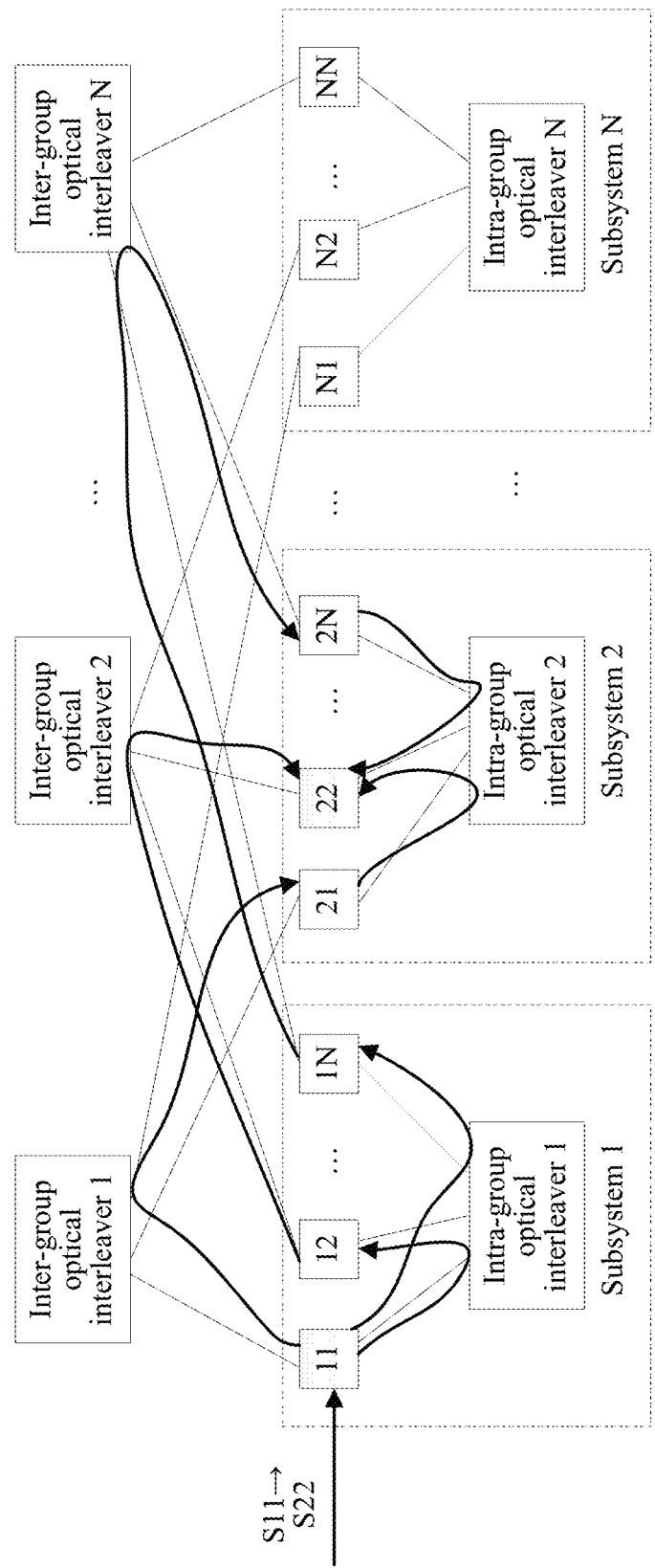
FIG. 13 is a schematic diagram of a second process of sending data traffic in the data switching system according to an embodiment of the present invention.

The acquiring, by the source switching apparatus, a first global overhead, sent by a direct switching apparatus connected to each network side port of the source switching apparatus, of each network side port of the direct switching apparatus includes: acquiring, by the source switching apparatus, first global overheads of each intra-group port and each inter-group port of each switching apparatus that is located in the same subsystem as the source switching apparatus, and acquiring first global overheads of each intra-group port and each inter-group port of each direct switching apparatus, of the source switching apparatus, located in a subsystem different from the subsystem of the source switching apparatus. In FIG. 13, S1 receives a first global overhead, sent by each direct switching apparatus to S11, of each network side port of the direct switching apparatus. For example, a switching apparatus S12 in a subsystem 1 sends a first global overhead k11 of each intra-group port connected to the intra-group optical interleaver 1 and a first global overhead k12 of an inter-group port connected to an inter-group optical interleaver 2, and a switching apparatus S21 in a subsystem 2 sends a first global overhead k12 of each inter-group port connected to the inter-group optical interleaver 1 and a first global overhead k11 of each intra-group port connected to an intra-group optical interleaver 2.

Rules of Generating Multipath Forwarding Table

In this embodiment of the present invention, each entry of the multipath forwarding table includes multiple ports, and the multiple ports represent multiple non-equivalent paths to the destination switching apparatus.

To implement load balancing between the multiple paths, when the source switching apparatus generates the multipath forwarding table, the following basic rules are followed:

(a) AD of FS<FD of Successor, that is, in the non-equivalent paths, an advertised distance of a feasible successor (FS) is less than a full distance (FD) of a successor;

(b) FD of FS<V*FD of Successor, that is, a full distance of the feasible successor is less than V times the full distance of the successor, where V is a variable.

The successor refers to a path having a minimum overhead, and the advertised distance refers to a distance of a first section of a path to the destination switching apparatus. For example, in FIG. 6c, in a path S1→S2→S5 from a switching apparatus S1 to a switching apparatus S5, S1→S2 is an advertised distance of the path S1→S2→S5.

Based on the foregoing basic rules, in an embodiment of the present invention, intra-group ports of all switching apparatuses in a subsystem have a same first local overhead and a same first global overhead, where the first local overhead of the intra-group port is different from the first global overhead of the intra-group port; and inter-group ports of all switching apparatuses in a data switching system have a same first local overhead and a same first global overhead, where the first local overhead of the inter-group port is different from the first global overhead of the inter-group port. The first local overhead of the intra-group port is different from the first local overhead of the inter-group port, and the first global overhead of the intra-group port is different from the first global overhead of the inter-group port. For example, each intra-group port may have a first global overhead of k11 and a first local overhead of k11+Δ11; and each inter-group port may have a first global overhead of k12 and a first local overhead of k12+Δ12, where Δ11 and Δ12 are increments that are set as required.

In this embodiment of the present invention, specific rules for the source switching apparatus to generate the multipath forwarding table include:

1: First global overhead of an intra-group port (equivalent to an advertised distance of an intra-group feasible successor)<First local overhead of the intra-group port (equivalent to a full distance of an intra-group successor).

Based on the foregoing condition, the first global overhead of the intra-group port is set to k11, and then the first local overhead of the intra-group port is k11+Δ11, where Δ11 is an increment; then $$k11 < k11 + \Delta 11 \quad \text{formula (1)}.$$

2: When a first local overhead and a first global overhead of an inter-group port are set, all of the following rules must be followed:

(B1) A path on which forwarding starts from an intra-group port is a successor, for example, First local overhead of an inter-group port of a source switching apparatus>Full distance of a successor of the inter-group port of the source switching apparatus (First local overhead of an intra-group port of the source switching apparatus+First global overhead of an inter-group port of a destination switching apparatus+First global overhead of an intra-group port of a direct switching apparatus, of the destination switching apparatus, in a subsystem in which the source switching apparatus is located), that is, $$k12 + \Delta 12 > k11 + \Delta 11 + k11 + k12 \quad \text{formula (2)}.$$

(B2) A path on which forwarding starts from an inter-group port is a feasible successor, where a full distance of the feasible successor is less than V times a full distance of a successor, that is, $$k12 + \Delta 12 + k11 < V*(k11 + \Delta 11 + k11 + k12) \quad \text{formula (3)}.$$

(B3) Data traffic cannot be forwarded by an inter-group port twice, which is stipulated as follows:

$$k12 + \Delta 12 + k11 > V*(k11 + \Delta 11 + k11 + k12) \quad \text{formula (4)},$$

or $$k12 > k11 + \Delta 11 + k11 + k12 \quad \text{formula (5)},$$

where the foregoing formula (5) has no solution, and a path matching the formula (4) is not selected as a feasible successor.

(B4) All paths connected to an intra-group port are successors or feasible successors, and a full distance of an inter-group feasible successor is less than V times a full distance of an inter-group successor, that is, $$k11 + \Delta 11 + k11 + k12 < V*(k11 + \Delta 11 + k12) \quad \text{formula (6), and}$$

an advertised distance of the inter-group feasible successor is less than the full distance of the inter-group successor, that is, $$k11 + k12 < k11 + \Delta 11 + k12 \quad \text{formula (7)}.$$

In addition, it may be further stipulated that:

(B5) when an intra-group fiber is broken, data traffic can be forwarded from all inter-group ports, that is, it is stipulated that an inter-group forwarding path is a feasible successor; then $$k12 + \Delta 12 + k11 + k12 < V*(K12 + \Delta 12) \quad \text{formula (8), and}$$

$$k11 + k12 < k12 + \Delta 12 \quad \text{formula (9)}.$$

It should be noted that, the foregoing rules must be followed, but there may be various formulas for implementing the rules, and the foregoing formulas in the present invention are merely exemplary, and are not intended to limit the present invention. By using the foregoing rules, the source switching apparatus may generate the multipath forwarding table. The foregoing rules may be applied to a scenario in which the data switching system includes one subsystem or multiple subsystems. When the data switching system includes only one subsystem, it is only required to set both k12 and Δ12 to 0, and in this case, the formulas (8) and (9) are still applicable, but no solution can be obtained, that is, no forwarding path can be generated.

Based on the foregoing basic rules, in another embodiment of the present invention, all intra-group ports of switching apparatuses in a subsystem have a same first local overhead and a same first global overhead, and the first local overhead of the intra-group port is the same as the first global overhead of the intra-group port. Inter-group ports of all switching apparatuses in the data switching system have a same first local overhead and a same first global overhead, and the first local overhead of the inter-group port is the same as the first global overhead of the inter-group port, that is, $\Delta 11$ and $\Delta 12$ both may be 0, and $k11=k12$. To implement load balancing between the multiple paths, when the source switching apparatus generates the multipath forwarding table, the following specific rules are followed:

C1) AD of FS<FD of Successor+e, that is, in the non-equivalent paths, an advertised distance of a feasible successor is less than a sum of a full distance of a successor and a set increment e; and C2) FD of FS<V*FD of Successor, that is, a full distance of the feasible successor is less than V times the full distance of the successor, where V may be a set coefficient.

Processing of Data Traffic by Another Switching Apparatus

As described above, in this embodiment of the present invention, after a source switching apparatus sends multiple portions of data traffic in a load balancing manner, a switching apparatus receiving the data traffic needs to forward the data traffic received by the switching apparatus to another switching apparatus (for example, an intermediate switching apparatus) or a user side port.

Because the switching apparatuses in the data switching system are fully connected, any switching apparatus in the data switching system may execute the foregoing operation. In an embodiment, the switching apparatus may be a switching apparatus 1800 shown in FIG. 18.

Figure 11:
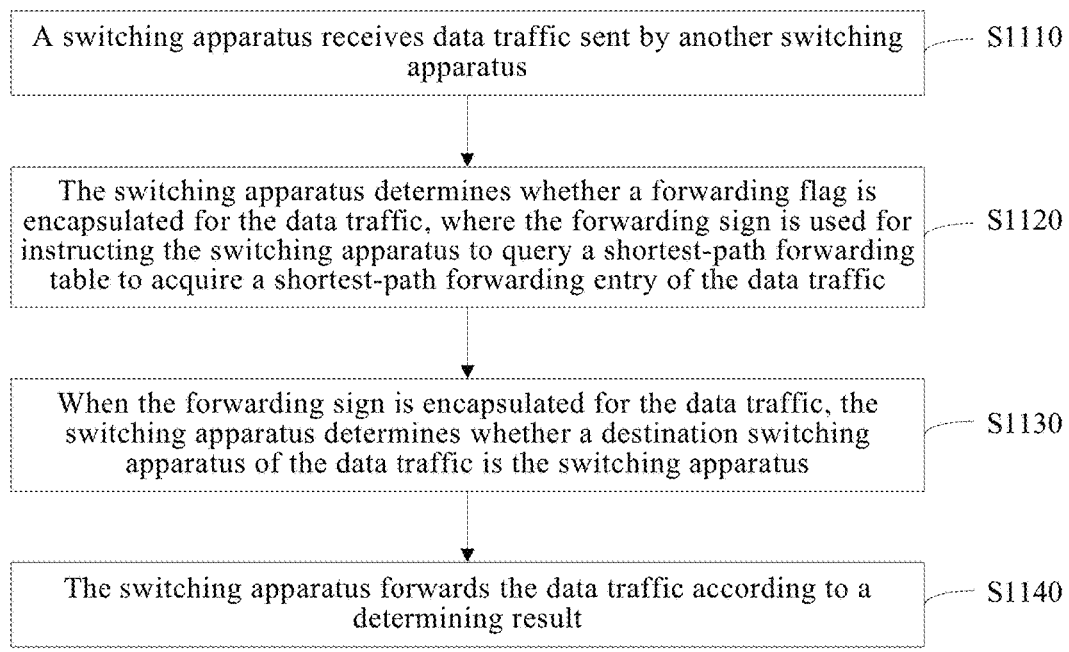
FIG. 11 is a schematic flowchart of another method for sending data traffic according to an embodiment of the present invention.

As shown in FIG. 11, the method includes steps S1110, S1120, S1130, and S1140.

S1110: A switching apparatus receives data traffic sent by another switching apparatus.

The switching apparatus and the another switching apparatus are located in the data switching system, the switching apparatus and the another switching apparatus may be located in a same subsystem or may be located in different subsystems, and the another switching apparatus may be a source switching apparatus or may be an intermediate switching apparatus. In a word, the another switching apparatus is any switching apparatus in the data switching system except the switching apparatus.

Figure 18:
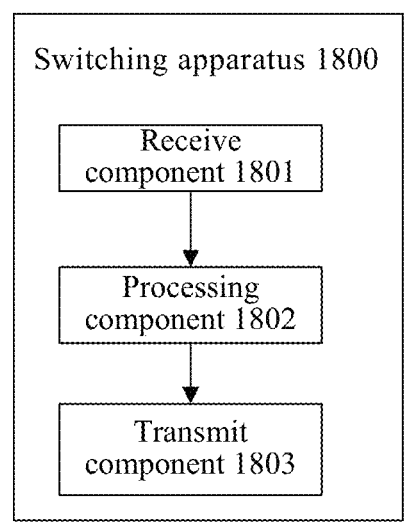
FIG. 18 is a schematic structural diagram of another switching apparatus according to an embodiment of the present invention.

Step S1110 may be performed by a receive component 1801 of the switching apparatus 1800 in FIG. 18, where the receive component 1801 may be any one of a receiver, a receiving unit, and a user side port.

S1120: The switching apparatus determines whether a forwarding flag is encapsulated for the data traffic, where the forwarding flag is used for instructing the switching apparatus to query a shortest-path forwarding table to acquire a shortest-path forwarding entry of the data traffic. If the forwarding flag is encapsulated for the data traffic, step S1130 is performed. If the forwarding flag is not encapsulated for the data traffic, the data traffic is forwarded according to a common technical means in the art.

Each switching apparatus stores two forwarding tables, where one is a multipath forwarding table, and one is a shortest-path forwarding table. Each forwarding entry of the shortest-path forwarding table includes a correspondence between a destination address and one port, and the shortest-path forwarding entry of the data traffic includes a correspondence between a destination address of the data traffic and one network side port.

S1130: When the forwarding flag is encapsulated for the data traffic, the switching apparatus determines whether a destination switching apparatus of the data traffic is the switching apparatus.

The determining, by the switching apparatus, whether a destination switching apparatus of the data traffic is the switching apparatus is specifically: querying, by the switching apparatus, the shortest-path forwarding table according to the destination address of the data traffic to obtain a shortest-path forwarding entry including the destination address, and when a port in the shortest-path forwarding table is a user side port, determining that the switching apparatus is the destination switching apparatus, or when a port in the shortest-path forwarding table is a network side port, determining that the switching apparatus is not the destination switching apparatus.

Steps S1120 and S1130 may be performed by a processing component 1802 of the switching apparatus 1800 in FIG. 18, where the processing component 1802 may be any one of a processor, a CPU, an ASIC, and a data plane.

S1140: The switching apparatus forwards the data traffic according to a determining result.

In an implementation manner of the method, the forwarding the data traffic according to a determining result includes:

when the destination switching apparatus of the data traffic is not the switching apparatus, forwarding, by the switching apparatus, the data traffic according to the shortest-path forwarding entry, so that the data traffic reaches the destination switching apparatus, where when the destination switching apparatus and the switching apparatus are located in a same subsystem, the switching apparatus sends the data traffic to the destination switching apparatus through an intra-group port according to the shortest-path forwarding entry; or when the destination switching apparatus and the switching apparatus are located in different subsystems, the switching apparatus sends, according to the shortest-path forwarding entry, the data traffic through an inter-group port to a direct switching apparatus, of the switching apparatus, in a subsystem in which the destination switching apparatus is located, so that the direct switching apparatus sends the data traffic to the destination switching apparatus.

In another implementation manner of the method, the forwarding the data traffic according to a determining result includes: when the destination switching apparatus of the data traffic is the switching apparatus, deleting the forwarding flag from the data traffic, and sending the data traffic from which the forwarding flag has been deleted to a device outside the data switching system according to the shortest-path forwarding entry, in the shortest-path forwarding table, including the destination address of the data traffic.

Step S1140 may be performed by a transmit component 1803 of the switching apparatus 1800 in FIG. 18, where the transmit component 1803 may be any one of a transmitter, a sending unit, a network side port, and a user side port.

Process and Rules of Generating Shortest-Path Forwarding Table

In an embodiment of the present invention, any switching apparatus in the data switching system further needs to generate the shortest-path forwarding table, and a rule of generating the shortest-path forwarding table includes: (1) a path to which an intra-group port is connected is a successor; and (2) when the destination switching apparatus of the data traffic and the switching apparatus are located in different subsystems, the data traffic is forwarded through only an inter-group port. The foregoing rules may be implemented by setting that: Second local overhead of the intra-group port=Second global overhead of the intra-group port, and Second local overhead of the inter-group port<Second global overhead of the inter-group port.

Specifically, steps of generating the shortest-path forwarding table may include:

acquiring, by the switching apparatus, a second local overhead of each network side port of the switching apparatus, where the second local overhead is configured on the switching apparatus and used by the switching apparatus only in calculating the shortest-path forwarding table;

acquiring, by the switching apparatus, a second global overhead, sent by a direct switching apparatus connected to each network side port of the switching apparatus, of each network side port of the direct switching apparatus, where the second global overhead is an overhead published by another switching apparatus and used when the switching apparatus in calculating the shortest-path forwarding table; and generating, by the switching apparatus, the shortest-path forwarding table according to the second local overhead of each network side port of the switching apparatus and the second global overhead, sent by the direct switching apparatus of each network side port of the switching apparatus, of each network side port of the direct switching apparatus.

In an implementation manner, when the network side ports include only intra-group ports, the acquiring, by the switching apparatus, a second local overhead of each network side port of the switching apparatus includes: acquiring, by the switching apparatus, a second local overhead of each intra-group port of the switching apparatus; and the acquiring, by the switching apparatus, a second global overhead, sent by a direct switching apparatus connected to each network side port of the switching apparatus, of each network side port of the direct switching apparatus includes: acquiring, by the switching apparatus, a second global overhead of each intra-group port of each switching apparatus that is located in a same subsystem as the switching apparatus. The second local overhead of the intra-group port is the same as the second global overhead of the intra-group port.

In another implementation manner, when the network side ports includes intra-group ports and inter-group ports, the acquiring, by the switching apparatus, a second local overhead of each network side port of the switching apparatus includes: separately acquiring, by the switching apparatus, second local overheads of each intra-group port and each inter-group port of the switching apparatus; and the acquiring, by the switching apparatus, a second global overhead, sent by a direct switching apparatus connected to each network side port of the switching apparatus, of each network side port of the direct switching apparatus includes: acquiring, by the switching apparatus, second global overheads of each intra-group port and each inter-group port of each switching apparatus that is located in a same subsystem as the switching apparatus, and acquiring second global overheads of each intra-group port and each inter-group port of each direct switching apparatus, of the switching apparatus, located in a subsystem different from the subsystem of the switching apparatus. The second global overhead of an inter-group port is equal to the second global overhead of an intra-group port, and the second local overhead of an inter-group port is less than the second local overhead of an intra-group port.

Example of Data Traffic Forwarding Process in Data Switching System

In this embodiment of the present invention, a source switching apparatus, an intermediate switching apparatus, and a destination switching apparatus in the data switching system cooperate with each other, which can implement forwarding of data traffic in a data center. A process of forwarding data traffic in the data switching system is described below with reference to FIG. 12 to FIG. 16.

Figure 12:
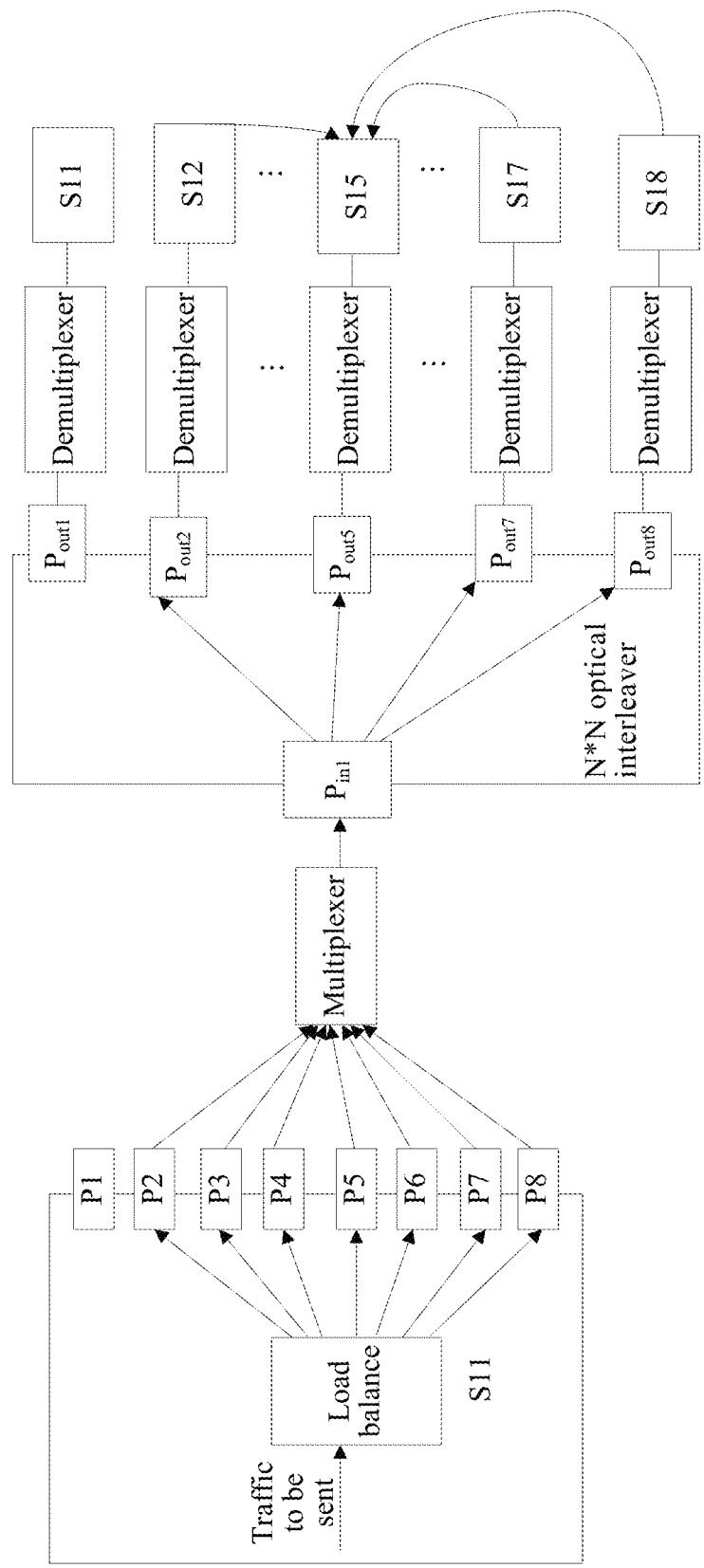
FIG. 12 is a schematic diagram of a first process of sending data traffic in the data switching system according to an embodiment of the present invention.

Corresponding to the implementation manner A described above, FIG. 12 is a schematic diagram of a first process of sending data traffic in the data switching system according to an embodiment of the present invention. In FIG. 12, a source switching apparatus and a destination switching apparatus are located in a same subsystem. Specifically, in the subsystem, M=8, that is, the subsystem includes eight switching apparatuses, which are S11, S12, . . . , and S18. S11 is the source switching apparatus, and S15 is the destination switching apparatus. After performing load balancing processing and encapsulating a forwarding flag for the data traffic, S11 obtains seven portions of data traffic, where the seven portions of data traffic are respectively sent by S11 according to a multipath forwarding table of S11 to network side ports P2 to P8 communicating with S12 to S18. Optical signals corresponding to the seven portions of data traffic are combined by an optical multiplexer, and then sent to an input port Pin1 of an optical interleaver via a fiber. After being processed in the optical interleaver, the optical signals corresponding to the seven portions of data traffic are respectively sent to the switching apparatuses S12 to S18 after passing through an optical demultiplexer. Intermediate switching apparatuses in the switching apparatuses S12 to S18, that is, S12 to S14 and S16 to S18, receive their respective portions of data traffic, and then respectively send the received portions of data traffic to S15 according to their respective shortest-path forwarding tables via a successor in the subsystem. After receiving all of the seven portions of data traffic, S15 aggregates all of the seven portions of data traffic to obtain the complete data traffic. It should be noted that, in FIG. 12, processes of sending data traffic to S15 by S12 to S14 and S16 to S18 are each represented by a curve, but during actual execution, the data traffic still needs to pass through the N*N optical interleaver when being sent to S15, where N>8.

In the process of forwarding data traffic in FIG. 12, the data traffic can reach the destination switching apparatus via multiple non-equivalent paths, which improves utilization of the data switching system and avoids data traffic congestion.

When the destination switching apparatus and the source switching apparatus of the data traffic are located in different subsystems, situations are shown in FIG. 13 to FIG. 18. For ease of description, an intra-group optical interleaver and an inter-group optical interleaver are both N*N optical interleavers, a quantity M of switching apparatuses included in each subsystem is the same as a specification N of an optical interleaver, each small block marked with a number represents a switching apparatus, and a curve with an arrow represents a sending direction of the data traffic.

Corresponding to the implementation manner B described above, FIG. 13 is a schematic diagram of a second process of sending data traffic in the data switching system according to an embodiment of the present invention. As shown in FIG. 13, a source switching apparatus is S11, and a destination switching apparatus is S22. After acquiring the data traffic, and performing load balancing processing and encapsulating a forwarding flag for the data traffic, S11 obtains N portions of data traffic. Then S11 respectively sends N−1 portions of the data traffic according to a multipath forwarding table of S11 by using an intra-group optical interleaver 1 in a subsystem 1 to another N−1 switching apparatuses in the subsystem 1, that is, switching apparatuses S12 to S1N, and sends the last one portion of data traffic by using an inter-group optical interleaver 1 to a direct switching apparatus in a subsystem 2, that is, S21. Each switching apparatus receiving one portion of data traffic determines whether the switching apparatus is a destination switching apparatus, and when determining that the switching apparatus is not the destination switching apparatus, forwards the portion of data traffic according to a shortest-path forwarding table of the switching apparatus. For example, after receiving one portion of data traffic, S12 determines that S12 is not the destination switching apparatus, and sends the portion of data traffic to a direct switching apparatus S22, of S12, in the subsystem 2 according to a shortest-path forwarding table of S12 by using an inter-group optical interleaver 2. Switching apparatuses S13 to S1N execute operations similar to those of S12, until all of the N portions of data traffic respectively reach N switching apparatuses in the subsystem 2. Intermediate switching apparatuses in the subsystem 2, that is, switching apparatuses S21 and S23 to S2N except S22, respectively send, to S22 according to their respective shortest-path forwarding tables by using an intra-group optical interleaver 2 in the subsystem 2, the portions of data traffic received by them. After receiving all of the N portions of data traffic, S22 aggregates the N portions of data traffic to obtain the data traffic.

In the process of forwarding data traffic in FIG. 13, the data traffic needs to be forwarded by the inter-group optical interleavers only once, which achieves higher forwarding performance.

Figure 14:
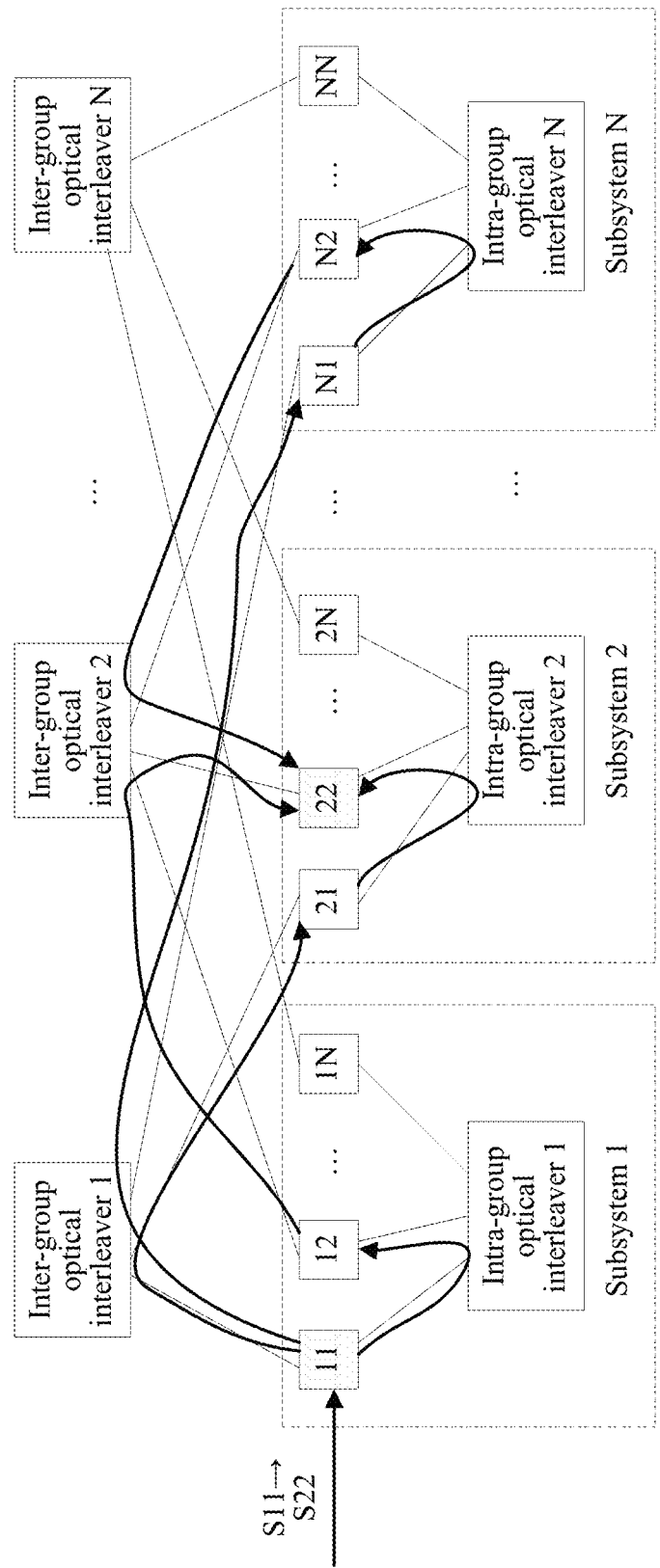
FIG. 14 is a schematic diagram of a third process of sending data traffic in the data switching system according to an embodiment of the present invention.

Corresponding to the implementation manner C described above, FIG. 14 is a schematic diagram of a third process of sending data traffic in the data switching system according to an embodiment of the present invention. As shown in FIG. 14, a source switching apparatus is S11, and a destination switching apparatus is S22. After acquiring the data traffic, and performing load balancing processing and encapsulating a forwarding flag for the data traffic, S11 obtains N portions of data traffic. Then S11 respectively sends N−1 portions of data traffic therein according to a multipath forwarding table of S11 by using an inter-group optical interleaver 1 to direct switching apparatuses of S11 in another N−1 subsystems, that is, switching apparatuses S21, S31, . . . , and SN1, and sends the last one portion of data traffic by using an intra-group optical interleaver 1 in a subsystem 1 to a direct switching apparatus S12, of S22, in the subsystem 1. Each switching apparatus receiving one portion of data traffic determines whether the switching apparatus is a destination switching apparatus, and when the switching apparatus is not the destination switching apparatus, forwards the received portion of data traffic according to a shortest-path forwarding table. For example, S12 and S21 determine that they are not the destination switching apparatus, and each directly sends the received portion of data traffic to S22 according to a respective shortest-path forwarding table; SN1 also determines that SN1 is not the destination switching apparatus, but a next hop to S22 in a shortest-path forwarding table of SN1 is a direct switching apparatus SN2 of S22, and then SN1 sends a received portion of data traffic to SN2, and SN2 sends the portion of data traffic to S22 according to a shortest-path forwarding table of SN2 by using an inter-group optical interleaver 2. After receiving all of the N portions of data traffic, S22 aggregates the N portions of data traffic to obtain the data traffic.

In the process shown in FIG. 14, the data traffic is shared in the entire data switching system, which can reduce data traffic congestion to a greatest extent, and improve utilization of the switching apparatuses.

Figure 15:
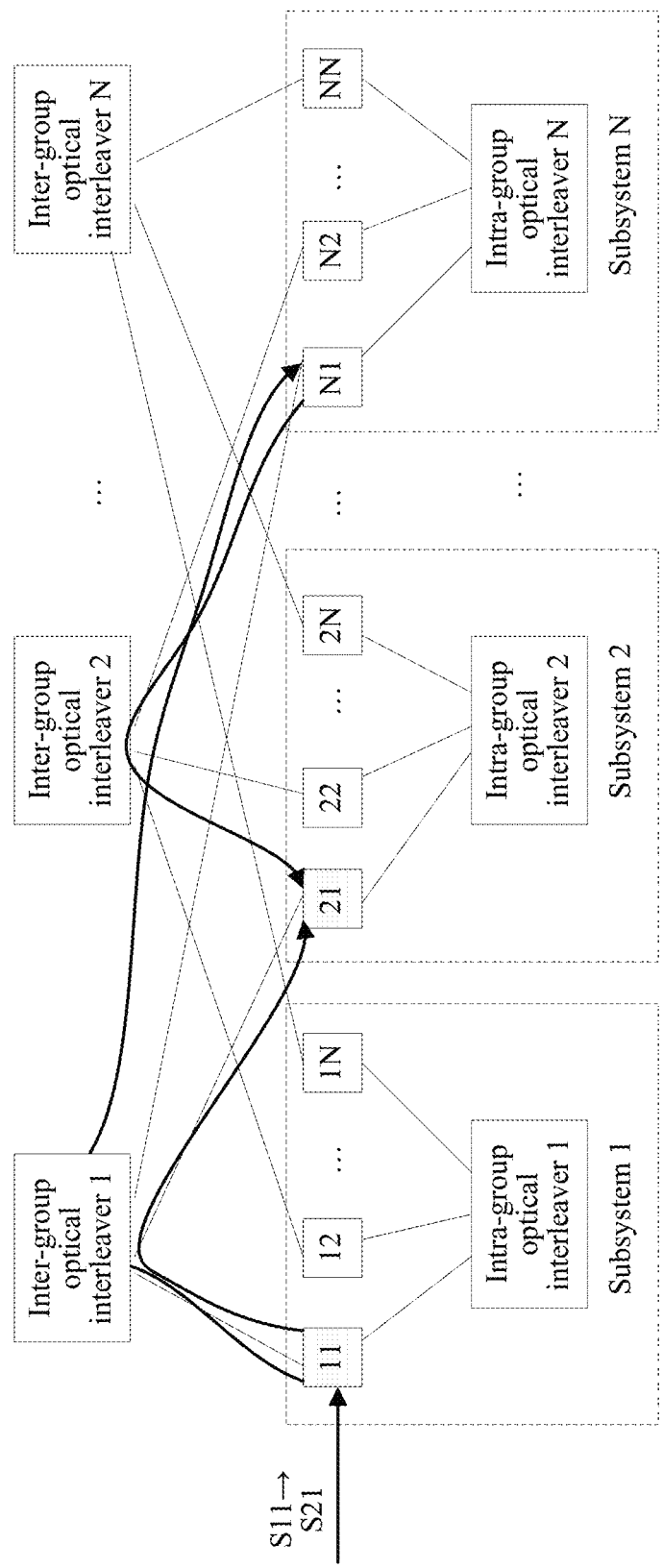
FIG. 15 is a schematic diagram of a fourth process of sending data traffic in the data switching system according to an embodiment of the present invention.

Corresponding to the implementation manner D described above, FIG. 15 is a schematic diagram of a fourth process of sending data traffic in the data switching system according to an embodiment of the present invention. As shown in FIG. 15, a source switching apparatus is S11, and a destination switching apparatus is S21, and S11 and S21 are located in different subsystems but are connected to a same inter-group optical interleaver, that is, an inter-group optical interleaver 1. After acquiring the data traffic, and performing load balancing processing and encapsulating a forwarding flag for the data traffic, S11 obtains N−1 portions of data traffic. S11 respectively sends the N−1 portions of data traffic by using the inter-group optical interleaver 1 to direct switching apparatuses, of S11, in other N−1 subsystems, that is, switching apparatuses S21, S31, . . . , and SN1. Each switching apparatus receiving one portion of data traffic determines whether the switching apparatus is a destination switching apparatus, and when the switching apparatus is not the destination switching apparatus, forwards the received portion of data traffic according to a shortest-path forwarding table. In this implementation manner, S31, . . . , and SN1 respectively send portions of data traffic that are received by them to S21 by using a corresponding inter-group optical interleaver. Therefore, after receiving all of the N−1 portions of data traffic, S21 aggregates the N−1 portions of data traffic to obtain the data traffic.

In the process shown in FIG. 15, when the destination switching apparatus and the source switching apparatus are located in different subsystems and are connected to a same inter-group optical interleaver, the data traffic can be sent to the destination switching apparatus through only an inter-group port, which improves data traffic forwarding efficiency while avoiding data traffic congestion.

Figure 16:
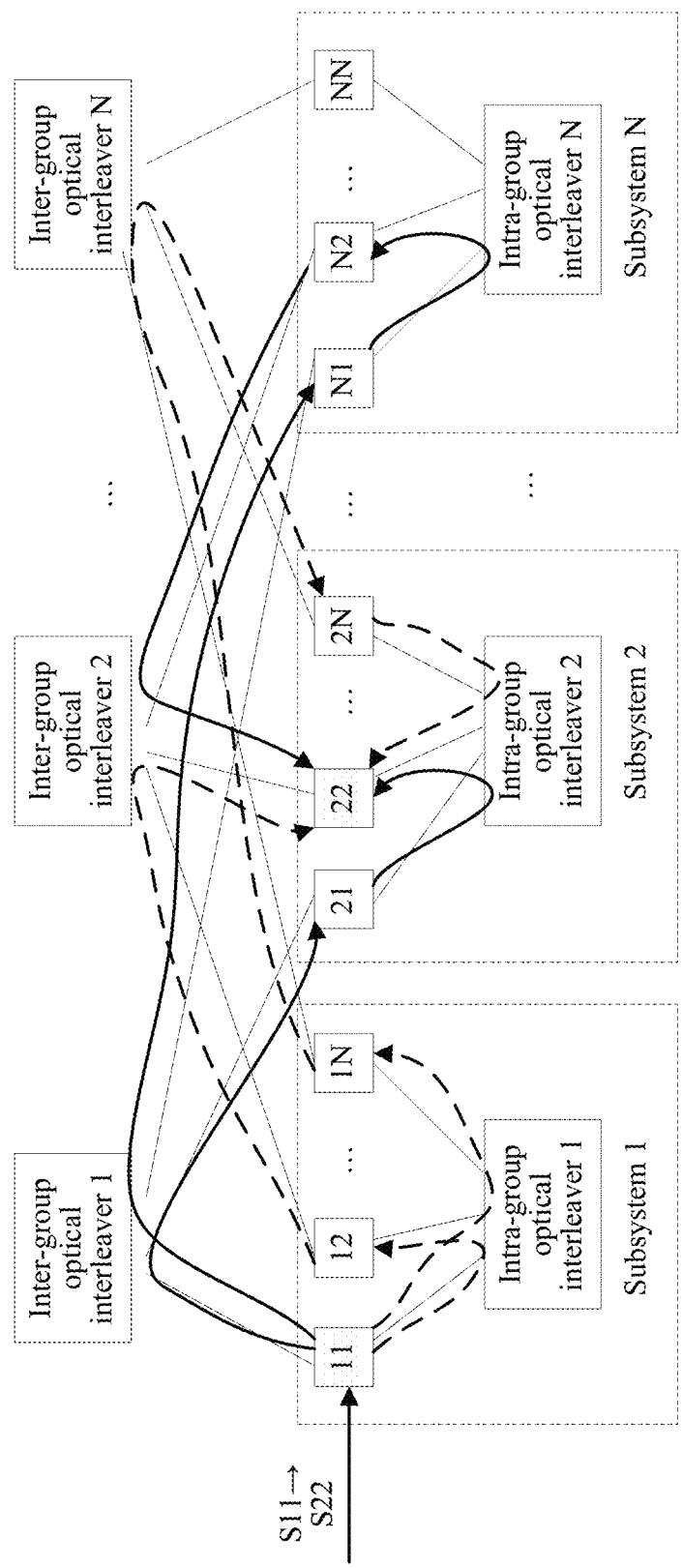
FIG. 16 is a schematic diagram of a fifth process of sending data traffic in the data switching system according to an embodiment of the present invention.

Corresponding to the implementation manner E described above, FIG. 16 is a schematic diagram of a fifth process of sending data traffic in the data switching system according to an embodiment of the present invention. As shown in FIG. 16, a source switching apparatus is S11, and a destination switching apparatus is S22. After acquiring the data traffic, and performing load balancing processing and encapsulating a forwarding flag for the data traffic, S11 obtains 2*(N−1) portions of data traffic. Then S11 respectively sends N−1 portions of data traffic therein according to a multipath forwarding table of S11 by using an inter-group optical interleaver 1 to direct switching apparatuses, of the source switching apparatus S11, in another N−1 subsystems, that is, switching apparatuses S21, S31, . . . , and SN1, and respectively sends the other N−1 portions of data traffic by using an intra-group optical interleaver 1 in a subsystem 1 to other switching apparatuses in the subsystem 1 except S11, that is, S12, . . . , and S1N. Each switching apparatus receiving one portion of data traffic determines whether the switching apparatus is a destination switching apparatus, and when the switching apparatus is not the destination switching apparatus, forwards the received portion of data traffic according to a shortest-path forwarding table. In this implementation manner, solid lines with an arrow represent forwarding paths of the N−1 portions of data traffic that are sent by S11 through inter-group ports, and dashed lines with an arrow represent forwarding paths of the N−1 portions of data traffic that are sent out by S11 through intra-group ports. Finally, all of the 2*(N−1) portions of data traffic reach S22. After receiving all of the N portions of data traffic, S22 aggregates the N portions of data traffic to obtain the data traffic.

In the process shown in FIG. 16, the data traffic is divided into 2*(N−1) portions, so that the data traffic is distributed in the data switching system more evenly, and network utilization is higher.

Corresponding to the implementation manner B described above, an embodiment of the present invention further provides a sixth process of sending data traffic in the data switching system (no figure is drawn, and for involved switching apparatuses, reference may be made to FIG. 13). Different from the second process, in the sixth process, S11 does not need to encapsulate the forwarding flag when forwarding the N portions of data traffic. Each switching apparatus receiving one portion of data traffic determines an attribute of a network side port receiving the one portion of data traffic, determines whether a destination switching apparatus of the traffic is located in a subsystem in which the switching apparatus is located, and when determining that the switching apparatus is not the destination switching apparatus, that the network side port is an intra-group port, and that the destination switching apparatus of the traffic is located in a different subsystem, further divides the one portion of traffic into N portions of sub traffic, sends one portion of sub traffic therein through the intra-group port to a direct switching apparatus, of the destination switching apparatus, in the subsystem in which the switching apparatus is located, and respectively sends the other N−1 portions of sub traffic through N−1 inter-group ports of the switching apparatus to direct switching apparatuses, of the destination switching apparatus, in another N−1 subsystems. For example, after receiving one portion of data traffic, S12 determines that S12 is not the destination switching apparatus, the portion of traffic is received through an intra-group port, and the destination switching apparatus is not in the subsystem 1. S12 divides the received traffic into N portions of sub traffic, sends one portion of sub traffic therein by using the inter-group optical interleaver 2 to the direct switching apparatus S22, of S12, in the subsystem 2, and respectively sends the other N−1 portions of sub traffic through intra-group ports to the switching apparatuses S11 and S13 to S1N. Each switching apparatus receiving one portion of sub traffic may send the received portion of sub traffic to the destination switching apparatus according to one of the foregoing first to fifth processes.

In the sixth process of forwarding data traffic, the data traffic needs to be forwarded by inter-group optical interleavers twice, which can implement congestion-free on an entire network.

Corresponding to the implementation manner C described above, an embodiment of the present invention further provides a seventh process of sending data traffic in the data switching system (no figure is drawn, and for involved switching apparatuses, reference may be made to FIG. 14). Different from the third process, in the seventh process, S11 does not need to encapsulate the forwarding flag when forwarding the N portions of data traffic. Each switching apparatus receiving one portion of data traffic determines an attribute of a network side port receiving the one portion of data traffic, determines whether a destination switching apparatus of the traffic is located in a subsystem in which the switching apparatus is located, and when determining that the switching apparatus is not the destination switching apparatus, that the network side port is an inter-group port, and that the destination switching apparatus of the traffic is located in a different subsystem, further divides the one portion of traffic into N portions of sub traffic, sends one portion of sub traffic therein through the inter-group port to a direct switching apparatus, of the switching apparatus, in a subsystem in which the destination switching apparatus is located, and respectively sends the other N−1 portions of sub traffic through N−1 intra-group ports of the switching apparatus to another N−1 switching apparatuses in the subsystem in which the switching apparatus is located. For example, after receiving one portion of traffic, SN1 determines that SN1 is not the destination switching apparatus, a network side port receiving the traffic is an inter-group port, and SN1 and the destination switching apparatus are located in different subsystems. SN1 divides the one portion of traffic into N portions of sub traffic, sends one portion therein by using the inter-group optical interleaver 1 to the direct switching apparatus S21, of SN1, in the subsystem 2, and respectively sends the other N−1 portions of sub traffic through N−1 intra-group ports to switching apparatuses SN2 to SNN in a subsystem N. Each switching apparatus receiving one portion of sub traffic may send the received portion of sub traffic to the destination switching apparatus according to one of the foregoing first to fifth processes.

In the seventh process of forwarding data traffic, the data traffic needs to be forwarded by inter-group optical interleavers twice, which can implement congestion-free on an entire network.

A person of ordinary skill in the art may understand that all or some of the steps of the method embodiments may be implemented by a computer program instructing relevant hardware. The program may be stored in a computer-readable storage medium. When the program is executed, the relevant hardware completes steps of methods described in the foregoing embodiments. The foregoing storage medium includes: any medium that can store program code, such as a read-only memory (ROM), a random access memory (RAM), a magnetic disk, or an optical disc. Correspondingly, an embodiment of the present invention further provides a computer program product, where the computer program product includes instructions for executing operations in the foregoing method embodiments.

Correspondingly, an embodiment of the present invention further provides a storage medium, where the storage medium is configured to store the computer program product.

The foregoing descriptions are merely exemplary implementation manners of the present invention. It should be noted that a person of ordinary skill in the art may make several improvements and polishing without departing from the principle of the present invention and the improvements and polishing shall fall within the protection scope of the present invention.

What is claimed is:

1. A data switching system, comprising K subsystems, wherein a first subsystem in the K subsystems comprises M switching apparatuses, a first switching apparatus in the M switching apparatuses comprises X network side ports, and the X network side ports comprise M−1 intra-group ports and K−1 inter-group ports, wherein
    the M−1 intra-group ports are respectively connected to M−1 switching apparatuses in the first subsystem except the first switching apparatus; and the K−1 inter-group ports are respectively connected to direct switching apparatuses, of the first switching apparatus, in K−1 subsystems in the K subsystems except the first subsystem;

wherein the first subsystem further comprises an N*N intra-group optical interleaver;

wherein each of the X network side ports comprises a transmit optical interface and a receive optical interface; and wherein among the M−1 intra-group ports that are respectively connected to M−1 switching apparatuses in the first subsystem except the first switching apparatus, all transmit optical interfaces of the M−1 intra-group ports are connected to an input port of the N*N intra-group optical interleaver, and all receive optical interfaces of the M−1 intra-group ports are connected to an output port of the N*N intra-group optical interleaver, wherein M and N are both natural numbers, and M≤N.

2. The data switching system according to claim 1, wherein the data switching system further comprises multiple N*N inter-group optical interleavers;

wherein among the K−1 inter-group ports that are respectively connected to direct switching apparatuses, of the first switching apparatus, in K−1 subsystems in the K subsystems except the first subsystem, all transmit optical interfaces of the K−1 inter-group ports are connected to an input port of a first N*N inter-group optical interleaver, and all receive optical interfaces of the K−1 inter-group ports are connected to an output port of the first N*N inter-group optical interleaver;

and wherein a sequence number of the first switching apparatus in the first subsystem is the same as a sequence number of the first N*N inter-group optical interleaver in the multiple N*N inter-group optical interleavers.

3. A switching apparatus, wherein the switching apparatus is any one of M switching apparatuses in a first subsystem of K subsystems in a data switching system, the switching apparatus comprises multiple network side ports, and the multiple network side ports comprise M−1 intra-group ports and K−1 inter-group ports, each of the multiple network side ports comprises a transmit optical interface and a receive optical interface;

wherein the first subsystem further comprises an N*N intra-group optical interleaver; wherein M and N are both natural numbers, and M≤N;

wherein all transmit optical interfaces of the M−1 intra-group ports are connected to an input port of the N*N intra-group optical interleaver, and all receive optical interfaces of the M−1 intra-group ports are connected to an output port of the N*N intra-group optical interleaver; and wherein the K−1 inter-group ports are respectively connected to direct switching apparatuses, of the first switching apparatus, in K−1 subsystems in the K subsystems except the first subsystem;

wherein the switching apparatus further comprises:

a receiver, configured to acquire data traffic through a user side port;

a processor, configured to query a multipath forwarding table according to a destination address of the data traffic to obtain a multipath forwarding entry comprising the destination address, wherein the multipath forwarding entry comprises a correspondence between the destination address and multiple network side ports; and a transmitter, configured to send the data traffic according to the multiple network side ports in a load balancing manner, so that all portions of data traffic in the data traffic reach, via different paths, a destination switching apparatus that is located in the same data switching system as the switching apparatus.

4. The apparatus according to claim 3, wherein the transmitter is further configured to:

before sending the data traffic according to the multiple network side ports in a load balancing manner, encapsulate a forwarding flag for the data traffic, wherein the forwarding flag is used for instructing a switching apparatus receiving the data traffic to query a shortest-path forwarding table to acquire a shortest-path forwarding entry of the data traffic, wherein the shortest-path forwarding entry comprises a correspondence between the destination address and one network side port.

5. The apparatus according to claim 3, wherein the processor is further configured to generate the multipath forwarding table; and when generating the multipath forwarding table, the processor is configured to:

acquire a first local overhead of each network side port of the switching apparatus, wherein the first local overhead is configured on the switching apparatus and is used by the processor only in calculating the multipath forwarding table;

acquire a first global overhead, sent by a direct switching apparatus connected to each network side port of the switching apparatus, of each network side port of the direct switching apparatus, wherein the first global overhead is an overhead published by the direct switching apparatus and used by the processor in calculating the multipath forwarding table; and generate the multipath forwarding table according to the first local overhead of each network side port of the switching apparatus and the first global overhead, sent by the direct switching apparatus of each network side port of the switching apparatus, of each network side port of the direct switching apparatus.

6. The apparatus according to claim 3, wherein the receiver is further configured to receive, through a network side port, data traffic sent by another switching apparatus;

the processor is further configured to determine an attribute of the network side port, and determine whether a destination switching apparatus of the data traffic received through the network side port is located in the first subsystem; and the transmitter is further configured to: when the network side port is an intra-group port and the destination switching apparatus of the data traffic received through the network side port is not located in the first subsystem, divide the data traffic received through the network side port into M portions, send one portion of data traffic therein through the intra-group port to a direct switching apparatus, of the destination switching apparatus, in the first subsystem, and respectively send the other M−1 portions of the traffic through the M−1 inter-group ports of the switching apparatus to direct switching apparatuses, of the destination switching apparatus, in the other M−1 subsystems.

7. The apparatus according to claim 3, wherein the receiver is further configured to receive, through a network side port, data traffic sent by another switching apparatus;

the processor is further configured to determine an attribute of the network side port, and determine whether a destination switching apparatus of the data traffic received through the network side port is located in the first subsystem; and the transmitter is further configured to: when the network side port is an inter-group port and the destination switching apparatus of the data traffic received through the network side port is not located in the first subsystem, divide the data traffic received through the network side port into M portions, send one portion of data traffic therein through an inter-group port to a direct switching apparatus in a subsystem in which the destination switching apparatus is located, and respectively send the other M−1 portions of the traffic through the M−1 intra-group ports of the switching apparatus to the other M−1 switching apparatuses in the first subsystem.

8. The apparatus according to claim 3, wherein the destination switching apparatus and the switching apparatus are located in a same subsystem in the data switching system, and the transmitter is configured to divide the data traffic into M−1 portions, and respectively send the M−1 portions of the traffic through the M−1 intra-group ports to the other M−1 switching apparatuses in the subsystem except the switching apparatus.

9. The apparatus according to claim 3, wherein the switching apparatus and the destination switching apparatus are located in different subsystems in the data switching system and are connected to different inter-group optical interleavers; and the transmitter is configured to divide the data traffic into M portions, send one portion of data traffic therein through an inter-group port to a direct switching apparatus, of the switching apparatus, in a subsystem in which the destination switching apparatus is located, and respectively send the other M−1 portions of the data traffic through the M−1 intra-group ports to the other M−1 switching apparatuses in the first subsystem except the switching apparatus.

10. The apparatus according to claim 3, wherein the switching apparatus and the destination switching apparatus are located in different subsystems in the data switching system and are connected to different inter-group optical interleavers; and the transmitter is configured to divide the data traffic into M portions, send one portion of data traffic therein through an intra-group port to a direct switching apparatus, of the destination switching apparatus, in the first subsystem, and respectively send the other M−1 portions of the data traffic through the M−1 inter-group ports to direct switching apparatuses, of the switching apparatus, in M−1 subsystems except the first subsystem.

11. The apparatus according to claim 3, wherein the switching apparatus and the destination switching apparatus are located in different subsystems in the data switching system and are connected to a same inter-group optical interleaver; and the transmitter is configured to divide the data traffic into M−1 portions, and respectively send the M−1 portions of the data traffic through the M−1 inter-group ports to direct switching apparatuses, of the switching apparatus, in M−1 subsystems except the first subsystem.

12. The apparatus according to claim 3, wherein the switching apparatus and the destination switching apparatus are located in different subsystems in the data switching system and are connected to different inter-group optical interleavers; and the transmitter is configured to divide the data traffic into 2*(M−1) portions, respectively send M−1 portions of the data traffic through the M−1 intra-group ports to M−1 switching apparatuses in the first subsystem except the switching apparatus, and respectively send the other M−1 portions of the data traffic through the M−1 inter-group ports to direct switching apparatuses, of the switching apparatus, in M−1 subsystems except the first subsystem.

13. The apparatus according to claim 5, wherein:

when acquiring the first local overhead of each network side port of the switching apparatus, the processor is configured to acquire a first local overhead of each of the M−1 intra-group ports of the switching apparatus; and when acquiring the first global overhead, sent by the direct switching apparatus connected to each network side port of the switching apparatus, of each network side port of the direct switching apparatus, the processor is configured to acquire a first global overhead of each intra-group port of each switching apparatus that is located in the same subsystem as the switching apparatus.

14. The apparatus according to claim 5, wherein:

when acquiring the first local overhead of each network side port of the switching apparatus, the processor is configured to separately acquire first local overheads of each of the M−1 intra-group ports and each of the K−1 inter-group ports of the switching apparatus; and when acquiring the first global overhead, sent by the direct switching apparatus connected to each network side port of the switching apparatus, of each network side port of the direct switching apparatus, the processor is configured to acquire first global overheads of each intra-group port and each inter-group port of each switching apparatus that is located in the same subsystem as the switching apparatus, and acquire first global overheads of each intra-group port and each inter-group port of each direct switching apparatus, of the switching apparatus, located in a subsystem different from the subsystem of the switching apparatus.

15. The apparatus according to claim 14, wherein a rule of generating the multipath forwarding table comprises:

the first global overhead of an intra-group port is less than the first local overhead of the intra-group port; and settings of the first local overhead and the first global overhead of an inter-group port meet the following conditions: a path on which forwarding starts from an intra-group port is a successor; the inter-group port can forward data traffic; data traffic cannot be forwarded by the inter-group port twice; and all paths connected to an intra-group port are successors or feasible successors, and a full distance of an inter-group feasible successor is less than V times a full distance of an inter-group successor, wherein V is a settable coefficient.

16. The apparatus according to claim 14, wherein the first local overhead of an intra-group port is the same as the first global overhead of the intra-group port, and the first local overhead of an inter-group port is the same as the first global overhead of the inter-group port; and a rule of generating the multipath forwarding table comprises:

in non-equivalent paths, an advertised distance (AD) of a feasible successor (FS) is less than a sum of a full distance (FD) of a successor and a set increment e; and a FD of the feasible successor is less than V times a FD of the successor, wherein V is a settable coefficient.

17. A switching apparatus, wherein the switching apparatus is any one of M switching apparatuses in a first subsystem of K subsystems in a data switching system, the switching apparatus comprises multiple network side ports, and the multiple network side ports comprise M−1 intra-group ports and K−1 inter-group ports, each of the multiple network side ports comprises a transmit optical interface and a receive optical interface;

wherein the first subsystem further comprises an N*N intra-group optical interleaver; wherein M and N are both natural numbers, and M≤N, wherein all transmit optical interfaces of the M−1 intra-group ports are connected to an input port of the N*N intra-group optical interleaver, and all receive optical interfaces of the M−1 intra-group ports are connected to an output port of the N*N intra-group optical interleaver; and wherein the K−1 inter-group ports are respectively connected to direct switching apparatuses, of the first switching apparatus, in K−1 subsystems in the K subsystems except the first subsystem;

wherein the switching apparatus further comprises:

a receiver, configured to receive data traffic sent by another switching apparatus, wherein the another switching apparatus is any switching apparatus in a data switching system except the switching apparatus;

a processor, configured to determine whether a forwarding flag is encapsulated for the data traffic, wherein the forwarding flag is used for instructing the switching apparatus to query a shortest-path forwarding table to acquire a shortest-path forwarding entry of the data traffic, wherein the shortest-path forwarding entry comprises a correspondence between a destination address of the data traffic and one network side port; and when the forwarding flag is encapsulated for the data traffic, determine whether a destination switching apparatus of the data traffic is the switching apparatus; and a transmitter, configured to forward the data traffic according to a result determined by the processor.

18. The apparatus according to claim 17, wherein when the destination switching apparatus of the data traffic is not the switching apparatus, the transmitter is configured to forward the data traffic according to the shortest-path forwarding entry, so that the data traffic reaches the destination switching apparatus; or when the destination switching apparatus of the data traffic is the switching apparatus, the transmitter is configured to delete the forwarding flag from the data traffic, and send the data traffic from which the forwarding flag has been deleted to a device outside the data switching system according to the shortest-path forwarding entry, in the shortest-path forwarding table, comprising the destination address of the data traffic.

19. The apparatus according to claim 18, wherein a rule of generating the shortest-path forwarding table comprises:

a path to which an intra-group port is connected is a successor; and when the destination switching apparatus of the data traffic and the switching apparatus are located in different subsystems, the data traffic is forwarded through only an inter-group port.

* * * * *